(12) United States Patent
Futaki et al.

(10) Patent No.: US 10,039,150 B2
(45) Date of Patent: *Jul. 31, 2018

(54) RADIO COMMUNICATION SYSTEM, RADIO STATION, RADIO TERMINAL, NETWORK APPARATUS, BEARER CONTROL METHOD, AND COMPUTER READABLE MEDIUM

(71) Applicant: NEC Corporation, Tokyo (JP)

(72) Inventors: Hisashi Futaki, Tokyo (JP); Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/450,996

(22) Filed: Mar. 6, 2017

(65) Prior Publication Data

US 2017/0231025 A1    Aug. 10, 2017

Related U.S. Application Data

(63) Continuation of application No. 14/430,969, filed as application No. PCT/JP2013/003805 on Jun. 19, 2013.

(30) Foreign Application Priority Data

Oct. 5, 2012 (JP) ................................. 2012-223178

(51) Int. Cl.
*H04W 72/04* (2009.01)
*H04W 76/15* (2018.01)
*H04W 76/02* (2009.01)

(52) U.S. Cl.
CPC ....... *H04W 76/15* (2018.02); *H04W 72/0406* (2013.01); *H04W 76/025* (2013.01)

(58) Field of Classification Search
CPC ... H04W 76/02; H04W 72/04; H04W 76/025; H04W 72/0406
See application file for complete search history.

(56) References Cited

U.S. PATENT DOCUMENTS

2010/0214943 A1    8/2010  Immendorf et al.
2010/0303039 A1    12/2010 Zhang et al.
(Continued)

FOREIGN PATENT DOCUMENTS

CN        101199671 A       6/2008
EP        2 544 496 A1      1/2013
(Continued)

OTHER PUBLICATIONS

Korean Notice of Preliminary Rejection issued in corresponding Korean Patent Application No. 2016-7036241, dated Jan. 10, 2017, 8 pages.

(Continued)

*Primary Examiner* — Andrew Lee
(74) *Attorney, Agent, or Firm* — Wilmer Cutler Pickering Hale and Dorr LLP

(57) ABSTRACT

A radio terminal (3) has a function of establishing a second radio connection on a second cell (20) operated by a second radio station (2) while a first radio connection on a first cell (10) operated by a first radio station (1) is established. The first radio station (1) sets up a control bearer for transferring at least a control signal regarding the radio terminal (3) between an upper network (4) and the first radio station (1). Further, the first radio station (1) is configured to trigger setup of a second bearer for transferring user data of the radio terminal (3) between the upper network (4) and the second radio station (2). It is thus for example possible to enable a single radio terminal to simultaneously set up bearers on cells of a plurality of radio stations, in order to (Continued)

achieve carrier aggregation of cells operated by different radio stations.

12 Claims, 26 Drawing Sheets

(56) References Cited

U.S. PATENT DOCUMENTS

| | | | |
|---|---|---|---|
| 2011/0044249 | A1 | 2/2011 | Wu et al. |
| 2011/0045826 | A1 | 2/2011 | Kim et al. |
| 2011/0051685 | A1 | 3/2011 | Saitou |
| 2011/0223854 | A1 | 9/2011 | Dottling et al. |
| 2012/0176955 | A1 | 7/2012 | Ishii et al. |
| 2012/0322486 | A1 | 12/2012 | Kameno et al. |
| 2013/0010702 | A1 | 1/2013 | Aminaka |
| 2013/0223222 | A1 | 8/2013 | Kotecha et al. |
| 2014/0010192 | A1 | 1/2014 | Chang et al. |
| 2014/0010207 | A1 | 1/2014 | Horn et al. |
| 2014/0043966 | A1 | 2/2014 | Lee et al. |
| 2014/0112310 | A1 | 4/2014 | Teyeb et al. |
| 2014/0192771 | A1 | 7/2014 | Jung et al. |
| 2015/0092696 | A1 | 4/2015 | Liu et al. |
| 2015/0245228 | A1 | 8/2015 | Uchino et al. |
| 2015/0312797 | A1 | 10/2015 | Cui et al. |
| 2016/0050587 | A1 | 2/2016 | Lam et al. |
| 2016/0087770 | A1 | 3/2016 | Chang et al. |
| 2016/0323798 | A1 | 11/2016 | Horn et al. |

FOREIGN PATENT DOCUMENTS

| | | |
|---|---|---|
| EP | 2 557 887 A1 | 2/2013 |
| EP | 2675228 A1 | 12/2013 |
| EP | 2897403 A1 | 7/2015 |
| JP | 2011-049987 A | 3/2011 |
| JP | 2012-520626 A | 9/2012 |
| WO | WO-2011/108637 A1 | 9/2011 |
| WO | WO-2011/125278 A1 | 10/2011 |
| WO | WO-2012/116625 A1 | 9/2012 |
| WO | WO-2013/173957 A1 | 11/2013 |
| WO | WO-2014/008380 A1 | 1/2014 |

OTHER PUBLICATIONS

3GPP 3rd Generation Partnership Project; Technical Specification Group Services and System Aspects; General Packet Radio Service (GPRS) Enhancements for Evolved Universal Terrestrial Radio Access Network (E-UTRAN) Access (Release 10), 3GPP TS 23.401 V10.4.0 (Jun. 2011), pp. 1-281.

China Notification of First Office Action issued in corresponding Chinese Patent Application No. 201380052399.1, dated Aug. 29, 2017, 23 pages.

Extended European Search Report issued by the European Patent Office for European Application No. 17150469.9 dated Jul. 12, 2017 (15 pages).

Nokia Corporation et al., "Introduction of Carrier aggregation enchancements," 3GPP Draft, Mobile Competence Centre, vol. RAN WG2, Meeting #79, R2-124366, pp. 20120813-20120817, 16 pages (Sep. 3, 2012).

3GPP RWS-120010, "Requirements, Candidate Solutions & Technology Roadmap for LTE Rel-12 Onward," Workshop on Release 12 and Onwards, NTT Docomo, Inc. Ljubljana, Slovenia, Jun. 11-12, 2012, 27 pages.

3GPP TS 36.331 v11.0.0, 3rd Generation Partnership Project; Technical Specification Group Radio Access Network; Evolved Universal Terrestrial Radio Access (E-UTRA); Radio Resource Control (RRC); Protocol Specification (Release 11), Jun. 2012, 302 pages.

3GPP TSG RWS-120046, "Technologies for Rel-12 and Onwards," Workshop on Release 12 and Onwards, Ljubljana, Slovenia, Samsung, Jun. 11-12, 2012, 31 pages.

Ericsson, "Views on Rel-12," 3GPP Workshop on Release 12 and onwards, RWS-120003, 13 pages (Jun. 1, 2012).

Extended European Search Report issued by the European Patent Office for Application No. 13844204.1 dated Jun. 28, 2016 (15 pages).

Huawei, "CA configuration before security activation," 3GPP TSG-RAN WG2 Meeting #71, R2-104860, Madrid, Spain, 5 pages (Aug. 23-27, 2010).

International Search Report, Corresponding to PCT/JP2013/003805, dated Jul. 30, 2013, 2 pages.

Korean Office Action issued by the Korean Intellectual Property Office for Application No. 2015-7009614 dated Jun. 24, 2016 (9 pages).

RADIO COMMUNICATION SYSTEM, RADIO STATION, RADIO TERMINAL, NETWORK APPARATUS, BEARER CONTROL METHOD, AND COMPUTER READABLE MEDIUM

CROSS-REFERENCE TO RELATED APPLICATIONS

The present application is a continuation patent application of U.S. patent application Ser. No. 14/430,969 entitled "Radio Communication System, Radio Station, Radio Terminal, Network Apparatus, Bearer Control Method, and Computer Readable Medium," filed Mar. 25, 2015, which is a U.S. national stage application of International Application No. PCT/JP2013/003805 filed on Jun. 19, 2013, which claims the benefit of priority from Japanese Patent Application No. JP2012-223178, filed on Oct. 5, 2012, the disclosures of each of which are incorporated herein in their entirety by reference thereto.

TECHNICAL FIELD

The present invention relates to a radio communication system in which a radio station communicates with a radio terminal using a plurality of cells.

BACKGROUND ART

In order to address a reduction in communication quality attributed to a sharp recent increase in mobile traffic and to provide faster high-speed communication, the 3GPP LTE (Long Term Evolution) has examined standardization of the carrier aggregation (Carrier Aggregation: CA) function in which a radio base station (eNode B: eNB) communicates with a radio terminal (User Equipment: UE) using a plurality of cells. Note that, cells that a UE can use in CA are limited to cells of a single eNB (i.e., cells operated by a single eNB).

The CA procedure will be described with reference to FIG. 26 (Non Patent Literature 1). FIG. 17 shows an example in which a UE performs CA of a first cell (Cell1) and a second cell (Cell2) both operated by an eNB. In Step S1, the UE establishes a radio connection with the eNB on the first cell (RRC Connection Establishment). In Step S2, the UE receives downlink data from the eNB through the first cell (Downlink data on Cell1). Here, for the UE, the first cell is the primary cell (Primary cell: PCell).

In Step S3, the eNB determines that it is necessary to configure a secondary cell (Secondary cell: SCell) for the UE, and configures a second cell as the SCell through the PCell (RRC Connection Reconfiguration on Cell1 (including Configuration of Cell2 (Secondary cell: SCell)). In Step S4, the UE transmits a completion notification to the eNB in response to completion of configuration of the second cell, that is, in response to completion of preparation of using the second cell (RRC Connection Reconfiguration Complete).

In Step S5, the eNB sends to the UE a notification of second cell use initiation (Cell2 Activation). In Step S6, the UE receives downlink data by simultaneously using the first and second cells (DL data on Cell1 and Cell2). Note that, the UE in Step S6 is just required to be capable of simultaneously using the first and second cells for downlink data reception. In other words, the UE is not required to constantly receive downlink data on both the first and second cells. Whether to use one of the first and second cells for downlink data reception or to use both of them is determined, for example, based on downlink data quantity or a service that the UE uses. The case where the UE transmits uplink data on the second cell can also be basically carried out by using a procedure similar to that shown in FIG. 26.

Though the UE that performs CA has functions of a Physical layer and at least part of a MAC (Medium Access Control) layer for each of the aggregated cells, the UE has the same structure of the RLC (Radio Link Control) and higher layers as in the case where CA is not performed. Accordingly, the core network (Evolved Packet Core: EPC) does not know whether or not the UE is performing CA.

Further, about a heterogeneous network (HetNet) environment, there is proposed a concept of Inter-eNB CA in which cells operated by different eNBs are aggregated (Non Patent Literature 2). For example, in Inter-eNB CA, it is considered to use a macro cell operated by a macro base station (Macro eNB: MeNB) and a pico cell operated by a pico base station (Pico eNB: PeNB).

Still further, there is also proposed a method in which a macro cell with wide coverage is used for transmission and reception of signals related to control such as UE mobility management, and a pico cell which has relatively good communication quality is used for transmission and reception of signals related to data such as user data (Non Patent Literature 3).

CITATION LIST

Non Patent Literature

[Non-Patent Literature 1] 3GPP TS 36.331 V11.0.0, "Evolved Universal Terrestrial Radio Access (E-UTRA); Radio Resource Control (RRC); Protocol specification", Section 5.3.5, July 2012

[Non-Patent Literature 2] 3GPP RWS-120046, Samsung Electronics, "Technologies for Rel-12 and Onwards", 3GPP TSG RAN Workshop on Rel-12 and Onwards Ljubljana, Slovenia, 11-12 Jun. 2012

[Non-Patent Literature 3] 3GPP RWS-120010, NTT DOCOMO, "Requirements, Candidate Solutions & Technology Roadmap for LTE Rel-12 Onward", 3GPP TSG RAN Workshop on Rel-12 and Onwards Ljubljana, Slovenia, 11-12 Jun. 2012

SUMMARY OF INVENTION

Technical Problem

In the conventional carrier aggregation (CA), since a radio terminal (UE) communicates through cells operated by a single radio station (eNB), the UE can configure the cells accordingly. Meanwhile, in carrier aggregation of cells operated by different eNBs (i.e., Inter-eNB CA), a data bearer for transferring user data must be set up at each cell, in order to enable a UE to simultaneously use the cells operated by the different eNBs for user data reception or transmission. Under the current LTE specification, however, when a UE has set up a data bearer at a cell of one eNB, another data bearer cannot be simultaneously set up at a cell of other eNB with the same UE.

Note that, the term "data bearer" as used in the present specification refers to a bearer for transferring user packets between an external network and a UE via an upper network (EPC (Evolved Packet Core)) and a radio access network (Radio Access Network: RAN) including an eNB. A mobile communication system generally creates a data bearer for each UE. This is to meet the necessity of swiftly switching (relocating) a packet transfer route to provide mobility to a UE. The data bearer in the LTE is an EPS (Evolved Packet System) bearer.

A core network bearer is a tunnel, i.e., a logical transmission path, that is set up between an external gateway (Packet Data Network Gateway: P-GW) and a data transferring node (Serving Gateway: S-GW) which are arranged in the upper network. The external gateway (P-GW) is a gateway node that is arranged at a boundary between the core network and the external network. The data transferring node (S-GW) is a node that is arranged at a boundary between the core network and the RAN. The core network bearer in the LTE is an S5/S8 bearer (i.e., a GTP (GPRS Tunneling Protocol) tunnel).

A radio access bearer is a bearer that is set up between the UE and the data transferring node (S-GW) within the upper network. The radio access bearer includes a bearer that is set up between the RAN and the upper network, and a radio bearer. The bearer that is set up between the RAN and the upper network is set up between a transfer node within the upper network and a RAN node that performs RLC (Radio Link Control) and RRC (Radio Resource Control) (i.e., an eNB in the LTE). The radio bearer is set up between the RAN node (eNB) and the UE in the RAN. The radio access bearer in the LTE is an E-RAB (E-UTRAN Radio Access Bearer). In the case of the LTE, the bearer that is set up between the RAN and the upper network is an S1 bearer (i.e., a GTP tunnel). Further, the radio bearer in the LTE is an EPS RB (Evolved Packet System Radio bearer).

One object of the present invention is to provide a radio communication system, a radio station, a radio terminal, a communication control method, and a program which contribute to enabling a single radio terminal to simultaneously set up bearers (e.g., an S1 bearer, an E-RAB, or an EPS bearer) through cells of a plurality of radio stations in order to achieve carrier aggregation of cells operated by different radio stations.

Solution to Problem

In a first aspect, a radio communication system includes a first radio station that operates a first cell, a second radio station that operates a second cell, a radio terminal, and an upper network. The radio terminal has a function of establishing a second radio connection on the second cell while a first radio connection on the first cell is established. The upper network is capable of performing signal transmission or reception to or from the radio terminal via the first and second radio stations. The upper network sets up a control bearer for sending at least a control signal related to the radio terminal between the upper network and the first radio station, and sets up a second bearer for transferring user data related to the radio terminal between the upper network and the second radio station. Further, the first radio station triggers setup of the second bearer.

In a second aspect, the first radio station includes a radio communication unit that operates a first cell and a communication control unit. The communication control unit controls communication with a radio terminal having a function of establishing a second radio connection on a second cell operated by a second radio station while a first radio connection on the first cell is established. Further, the communication control unit sets up a control bearer for sending at least a control signal related to the radio terminal between an upper network and the first radio station, and triggers setup of a second bearer for transferring user data related to the radio terminal between the upper network and the second radio station.

In a third aspect, a second radio station includes a radio communication unit that operates a second cell and a communication control unit. The communication control unit controls communication with a radio terminal having a function of establishing a second radio connection on the second cell while a first radio connection on a first cell operated by a first radio station is established. Further, the communication control unit sets up a second bearer for transferring user data related to the radio terminal between an upper network and the second radio station, in response to a request or an instruction from the first radio station or from the upper network triggered by the first radio station.

In a fourth aspect, a radio terminal includes a radio communication unit and a communication control unit. The communication control unit controls the radio communication unit to receive an instruction of use initiation of the second cell from the first radio station according to the first or second aspect, to establish a second radio connection while the first radio connection is established, and to perform reception or transmission of user data at least on the second cell.

In a fifth aspect, a network apparatus arranged in an upper network includes a control unit. The control unit controls setup of a bearer for a radio terminal having a function of establishing a second radio connection in a second cell operated by a second radio station while a first radio connection on a first cell operated by a first radio station is established. The control unit controls the upper network to set up a control bearer for sending or receiving at least a control signal related to the radio terminal on the first cell via the first radio station. Further, the control unit controls the upper network to set up a second bearer for sending or receiving user data on the second cell via the second radio station, in response to a bearer setup request that is triggered by the first radio station and sent from the first or second radio station.

In a sixth aspect, a bearer control method, in a first radio station operating a first cell, includes:

(a) setting up a control bearer for sending at least a control signal related to a radio terminal between an upper network and the first radio station, the radio terminal having a function of establishing a second radio connection on a second cell operated by a second radio station while a first radio connection on the first cell is established; and (b) triggering setup of a second bearer for transferring user data related to the radio terminal between the upper network and the second radio station.

In a seventh aspect, a bearer control method, in a second radio station operating a second cell, includes setting up a second bearer for transferring user data related to a radio terminal between an upper network and the second radio station, in response to a request or an instruction from a first radio station or from the upper network being triggered by the first radio station. Here, the radio terminal has a function of establishing a second radio connection on the second cell while a first radio connection on a first cell operated by a first radio station is established, in response to one of a request and an instruction from the first radio station or one of a request and an instruction from the upper network triggered by the first radio station.

In an eighth aspect, a communication control method in a radio terminal includes: receiving an instruction of use initiation of the second cell from the first radio station according to the first or second aspect; establishing a second radio connection while the first radio connection is established; and performing reception or transmission of user data at least on the second cell.

In a ninth aspect, a bearer control method, in a network apparatus arranged in an upper network, includes:

(a) controlling the upper network to set up a control bearer for sending or receiving at least a control signal related to a radio terminal on a first cell via a first radio station, the radio terminal having a function of establishing a second radio connection on a second cell operated by a second radio station while a first radio connection on the first cell operated by the first radio station is established; and (b) controlling the upper network to set a second bearer for sending or receiving user data related to the radio terminal on the second cell via the second radio station, in response to a bearer setup request that is triggered by the first radio station and sent from the first or second radio station.

In a tenth aspect, a program includes instructions for causing a computer to perform the bearer control method in a first radio station according to the sixth aspect.

In an eleventh aspect, a program includes instructions for causing a computer to perform the communication control method in a second radio station according to the seventh aspect.

In an eleventh aspect, a program includes instructions for causing a computer to perform the bearer control method in a radio terminal according to the eighth aspect.

In a twelfth aspect, a program includes instructions for causing a computer to perform the bearer control method in a network apparatus according to the ninth aspect.

Advantageous Effects of Invention

According to the aspects described above, it is possible to provide a radio communication system, a radio station, a radio terminal, a communication control method, and a program which contribute to enabling a single radio terminal to simultaneously set up bearers (e.g., an S1 bearer, an E-RAB, or an EPS bearer) through cells of a plurality of radio stations in order to achieve carrier aggregation of cells operated by different radio stations.

DESCRIPTION OF EMBODIMENTS

Hereinafter, specific embodiments will be explained in detail with reference to the drawings. The same or corresponding components are denoted by the same reference symbols throughout the drawings, and repetitive explanations will be omitted as necessary for the sake of clarity.

First Embodiment

Figure 1:
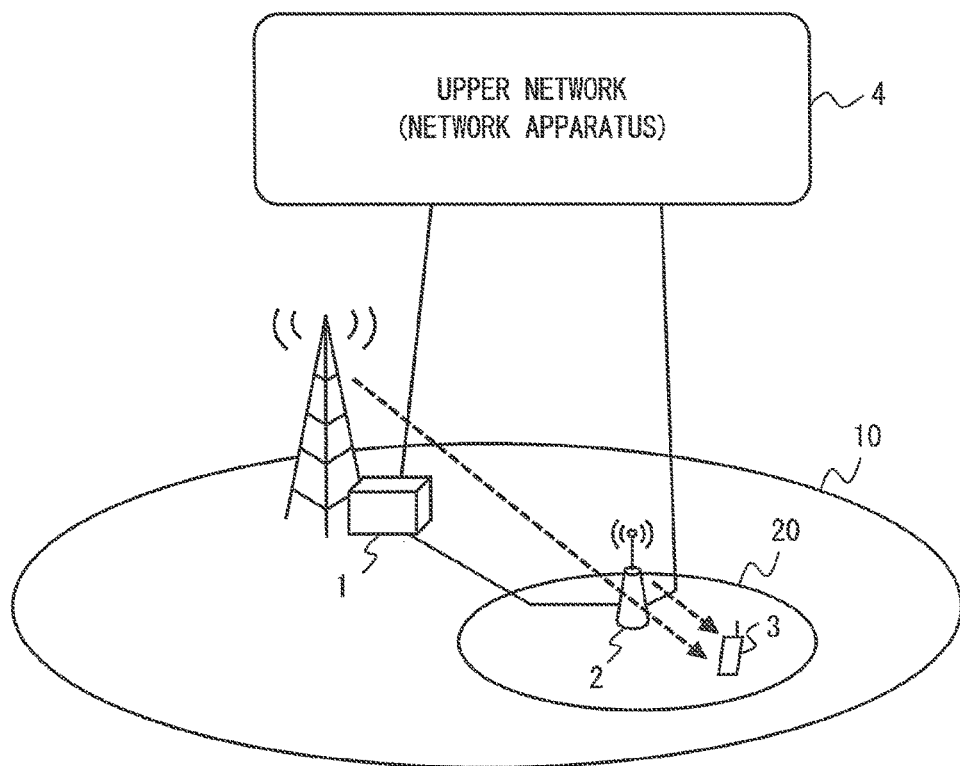
FIG. 1 is a diagram showing a configuration example of a radio communication system according to a first embodiment.

FIG. 1 shows a configuration example of a radio communication system according to the present embodiment. The radio communication system according to the present embodiment includes a first radio station 1, a second radio station 2, a radio terminal 3, and an upper network 4. The radio stations 1 and 2 operate a first cell 10 and a second cell 20, respectively. The radio stations 1 and 2 are, for example, a radio base station or a base station controller. The radio terminal 3 is configured to establish a second radio connection on the second cell 20 while maintaining a first radio connection on the first cell 10. This allows the radio terminal 3 to simultaneously use a plurality of cells (e.g., the cells 10 and 20) for transmitting or receiving any signal (e.g., user data or control information). In other words, the radio terminal 3 supports carrier aggregation of cells operated by different radio stations.

Note that, the expression "to simultaneously use cells" is not limited to the manner of simultaneously receiving or transmitting signals actually on the cells. Instead, it includes the manner of receiving or transmitting signals actually on any one of the cells although the radio terminal 3 can receive or transmit signals on both of the cells, the manner of receiving or transmitting signals of different types on the respective cells, or the manner of using each of the cells for one of signal reception or transmission.

Further, in the present specification, "establishing a radio connection" means, for example, that a radio terminal and a radio station become communicable with each other, or that a radio terminal and a radio station share information required for communication with each other.

Further, FIG. 1 shows a HetNet environment. Specifically, the first cell 10 shown in FIG. 1 has a wider coverage area than the second cell 20 does. Further, FIG. 1 shows a hierarchical cell structure in which the second cell 20 is arranged in the first cell 10. However, the cell structure shown in FIG. 1 is merely an example. For example, the first and second cells 10 and 20 may have equivalent coverage areas. In other words, the radio communication system according to the present embodiment may be applied to a homogeneous network environment.

The upper network 4 is a network that is generally managed by an operator providing mobile communication services. The upper network 4 has control-related (control plane: C-plane) functions for performing mobility management (e.g., location registration, location update) and bearer management (e.g., bearer establishment, bearer configuration modification, bearer release) for the radio terminal 3, and data-related (user plane: U-plane) functions for transferring user data of the radio terminal 3 between the radio stations 1 and 2 and a not-shown external network. That is, the upper network 4 includes at least one mobility management apparatus that has the C-plane functions, and at least one data transferring apparatus that has the U-plane functions. The at least one data transferring apparatus may include a node arranged at a boundary between the upper network 4 and a RAN including the radio stations 1 and 2, and an external gateway arranged at a boundary between the upper network 4 and the external network.

In order to enable the radio terminal 3 to simultaneously use the cells 10 and 20, which are operated by the different radio stations 1 and 2, for transmitting or receiving signals (e.g., user data or control information), the radio communication system according to the present embodiment is required to simultaneously set up bearers (e.g., a control bearer, an S1 bearer, an E-RAB, or an EPS bearer) for the radio terminal 3 at the cells 10 and 20 of the radio stations 1 and 2. To this end, the radio communication system according to the present embodiment operates in the following manner. That is, the upper network 4 is configured to set up at least one of a first bearer for sending or receiving user data on the cell 10 via the radio station 1 and a control bearer for sending or receiving control signal on the cell 10 via the radio station 1. The upper network 4 is also configured to set up a second bearer for sending or receiving user data on the cell 20 via the radio station 2. Here, the first bearer includes a bearer for transferring user data between the upper network 4 and the radio station 1 (e.g., an S1 bearer or an E-RAB). The control bearer includes a bearer for sending or receiving control signals between the upper network 4 and the radio station 1. The second bearer includes a bearer for transferring user data between the upper network 4 and the radio station 2 (e.g., an S1 bearer or an E-RAB).

Further, the radio station 1 is configured to trigger setup of the second bearer. That is, in the present embodiment, the radio station 1, which is neither the radio terminal 3 nor the radio station 2 using the second bearer, triggers setup of the second bearer. The upper network 4 controls the setup of the second bearer triggered by the radio station 1. Thus, according to the present embodiment, it is possible to simultaneously set up bearers (e.g., a control bearer, an S1 bearer, an E-RAB, or an EPS bearer) for the radio terminal 3 at the cells 10 and 20 for achieving carrier aggregation of the cells 10 and 20 that are operated by the different radio stations 1 and 2.

Note that, in the present embodiment, the second bearer may be a direct bearer between the radio station 2 and the upper network 4, or it may be a bearer that passes through the radio station 1. In other words, the user data that the radio terminal 3 transmits or receives on the cell 20 via the radio station 2 may be transferred between the radio station 2 and the upper network 4 via the radio station 1.

The radio station 1 may trigger the setup of the second bearer, while communicating with the radio terminal 3 on the first cell 10 and using the first bearer. The radio station 1 may trigger the setup of the second bearer in response to at least one of (a) detection of the second cell 20 by the radio terminal 3, (b) satisfaction of a prescribed condition relating to the traffic load of the first cell 10, and (c) a request from the radio terminal 3 requesting for a service of a prescribed type.

In the following, a procedure for setting up the second bearer will be described. In one example, the radio station 1 may trigger the radio station 2 to set up the second bearer. In this case, the radio station 1 may send a bearer setup request to the radio station 2 for the purpose of triggering the setup of the second bearer. In other example, the radio station 1 may trigger the upper network 4 to set up the second bearer. In this case, the radio station 1 may send a bearer setup request to the upper network 4 for the purpose of triggering the setup of the second bearer. Further, there are several examples of the setup procedure of the second bearer, which is initiated in response to the trigger from the radio station 1. Three examples of the setup procedure of the second bearer (first to third exemplary procedures) will be outlined below.

In the first exemplary procedure, the radio station 1 sends a bearer setup request to the radio station 2, to thereby trigger the radio station 2 to set up the second bearer. At this time, the radio station 1 may send at least one of terminal individual information, initial terminal information, and non-access stratum (Non-Access Stratum: NAS) information of the radio terminal 3 relating to the setup of the second bearer. Next, in response to the request from the radio station 1, the radio station 2 sends a setup request of the second bearer to the upper network 4 (i.e., the mobility management apparatus). Subsequently, the upper network 4 performs bearer setup in the upper network 4 in response to the bearer setup request from the radio station 2, and notifies the radio station 2 of bearer configuration information relating to the second bearer. The bearer configuration information includes, for example, (a) an address of the radio terminal 3, (b) an endpoint identifier on the upper network 4 side associated with the bearer between the radio station 2 and the upper network 4, and (c) QoS (Quality of Service) information of the second bearer. Then, the radio station 2 sets up the bearer (e.g., an S1 bearer) between the radio station 2 and the upper network 4 and a radio bearer associated with the radio terminal 3 (e.g., an EPS RB), based on the bearer configuration information. The radio station 2 may send a completion notification to the radio station 1 after the setup of the second bearer. Here, the completion notification may include at least one of the terminal individual information, non-access stratum information, and bearer configuration information of the radio terminal 3.

In the second exemplary procedure, the radio station 1 sends a bearer setup request to the upper network 4, to thereby trigger the upper network 4 to set up the second bearer. Next, the upper network 4 performs bearer setup in the upper network 4 in response to the bearer setup request from the radio station 1, and notifies the radio station 1 of bearer configuration information relating to the second bearer. Subsequently, the radio station 1 transfers at least part of the received bearer configuration information to the radio station 2. Then, the radio station 2 sets up the bearer (e.g., an S1 bearer) between the radio station 2 and the upper network 4 and a radio bearer (e.g., an EPS RB) associated with the radio terminal 3, based on the bearer configuration information. In the second exemplary procedure, the radio station 1 may send at least one of the terminal individual information, initial terminal information, and non-access stratum information of the radio terminal 3 relating to the setup of the second bearer to one or both of the upper network 4 and the radio station 2.

In the third exemplary procedure, similarly to the second exemplary procedure, the radio station 1 sends a bearer setup request to the upper network 4, to thereby trigger the upper network 4 to set up the second bearer. Next, similarly to the second exemplary procedure, the upper network 4 performs bearer setup in the upper network 4 in response to the bearer setup request from the radio station 1. Note that, in the third exemplary procedure, the upper network 4 notifies the radio station 2, instead of the radio station 1, of the bearer configuration information relating to the second bearer. Then, the radio station 2 sets up the bearer (e.g., an S1 bearer) between the radio station 2 and the upper network 4 and a radio bearer (e.g., an EPS RB) associated with the radio terminal 3, based on the bearer configuration information. In the third exemplary procedure, the radio station 1 may send at least one of the terminal individual information, initial terminal information, and non-access stratum information of the radio terminal 3 relating to the setup of the second bearer to one or both of the upper network 4 and the radio station 2. The upper network 4 may send, to the radio station 1 directly or via the radio station 2, at least one of the terminal individual information and non-access stratum information of the radio terminal 3, after completion of setup of the second bearer in the upper network 4 (e.g., the endpoint configuration of the S1 bearer).

In the first to third exemplary procedures, the radio station 1 may perform setup of the radio bearer between the radio station 2 and the radio terminal 3, and notify the radio station 2 of the radio resource control information, the radio resource configuration information and the like relating to the setup of the radio bearer.

In the first to third exemplary procedures, the bearer configuration information relating to the second bearer may include at least one of the information elements listed below:
bearer information;
radio terminal capability information;
radio terminal identifier information;
selected network information; and
security information.

The terminal individual information of the radio terminal 3 relating to the setup of the second bearer may include at least one of the information elements listed below:
radio terminal capability information;
radio terminal identifier information;
selected network information;
bearer information;
radio resource control information;
radio terminal mobility history information; and
service information.

The initial terminal information of the radio terminal 3 relating to the setup of the second bearer may include at least one of the information elements listed below:
radio terminal identifier information;
selected network information;
radio terminal area information;
radio connection purpose (cause); and
non-access stratum data.

The non-access stratum information of the radio terminal 3 relating to the setup of the second bearer may include at least one of the information elements listed below:
radio terminal identifier information;
selected network information; and
non-access stratum data.

The first to third exemplary procedures may be applied to various applications including, but not limited to, casein application where the first radio station 1 is a radio station that operates (manages) a cell with relatively large coverage and the second radio station 2 is a low power radio station (Low Power Node: LPN) that operates (manages) a cell with small coverage. The LPN may be, for example, a radio station having similar functions as the radio station 1, or may be a new type network node (New Node) with reduced functions as compared with the radio station 1. Further, the second cell may be a new type cell (New Cell Type) being different from a conventional cell, i.e., the second cell may use a new type carrier (New Carrier Type) being different from a conventional carrier.

Figure 2:
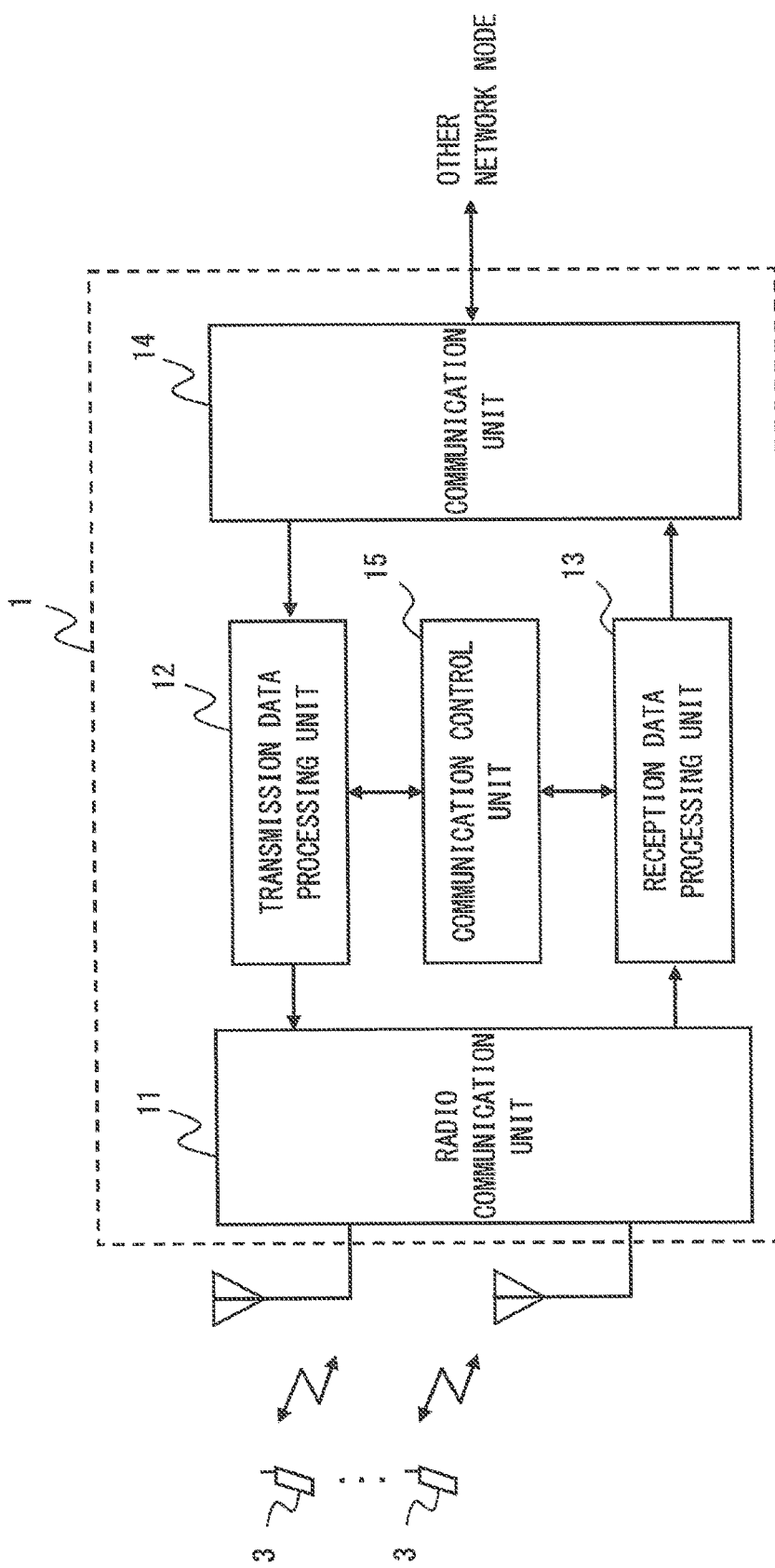
FIG. 2 is a diagram showing a configuration example of a first radio station according to the first embodiment.

In the following, configuration examples of the radio stations 1 and 2, the radio terminal 3, and the nodes of the upper network 4 (mobility management apparatus 5 and data transferring apparatus 6) according to the present embodiment will be described. FIG. 2 is a block diagram showing a configuration example of the first radio station 1. A radio communication unit 11 receives an uplink signal transmitted from the radio terminal 3 via an antenna. A reception data processing unit 13 reconstructs any received uplink signal. The obtained reception data is transferred to, via a communication unit 14, other network node, e.g., a data transferring apparatus or a mobility management apparatus in the upper network, or other radio station. For example, the uplink user data received from the radio terminal 3 is transferred to the data transferring apparatus in the upper network. Further, Non-Access-Stratum (NAS) control data out of the control data received from the radio terminal 3 is transferred to the mobility management apparatus in the upper network. Further, the reception data processing unit 13 receives, from a communication control unit 15, the control data to be transmitted to the radio station 2 or the upper network 4, and sends the control data to the radio station 2 or the upper network 4 via the communication unit 14.

A transmission data processing unit 12 receives user data destined for the radio terminal 3 from the communication unit 14, and generates a transport channel by performing error-correction coding, rate matching, interleaving or the like. Further, the transmission data processing unit 12 adds control information to the data sequence of the transport channel to generate a transmission symbol sequence. The radio communication unit 11 performs processes such as carrier wave modulation based on the transmission symbol sequence, frequency conversion, signal amplification or the like to generate a downlink signal (downlink signal), and transmits the generated downlink signal to the radio terminal 3. Further, the transmission data processing unit 12 receives, from the communication control unit 15, control data to be transmitted to the radio terminal 3, and sends the received control data to the radio terminal 3 via the radio communication unit 11.

The communication control unit 15 triggers setup of the second bearer by sending a request to the radio station 2 or the upper network 4, in order to enable the radio terminal 3 to simultaneously use the cells 10 and 20 for receiving or sending signals (e.g., user data or control signal). That is, the communication control unit 15 initiates setup of the second bearer between the upper network and other radio station 2, for the radio terminal 3 belonging to its own cell (cell 10).

Figure 3:
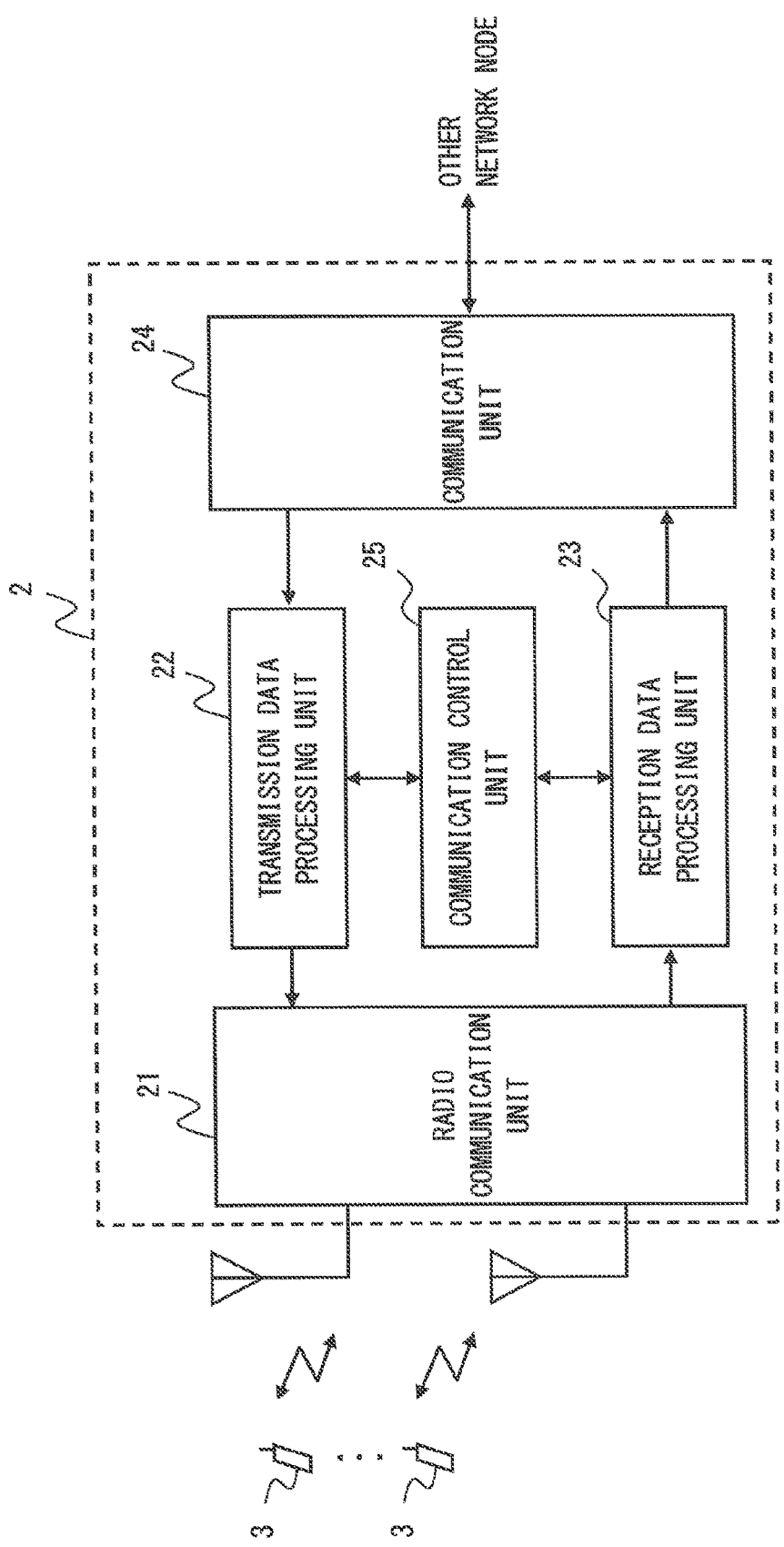
FIG. 3 is a diagram showing a configuration example of a second radio station according to the first embodiment.

FIG. 3 is a block diagram showing a configuration example of the second radio station 2. The functions and operations of a radio communication unit 21, a transmission data processing unit 22, a reception data processing unit 23, and a communication unit 24 shown in FIG. 3 are identical to those of the corresponding elements of the radio station 1 shown in FIG. 2, i.e., the radio communication unit 11, the transmission data processing unit 12, the reception data processing unit 13, and the communication unit 14.

A communication control unit 25 of the radio station 2 communicates with at least one of the radio station 1 and the upper network 4 during the setup procedure of the second bearer triggered by the radio station 1, and sets up the second bearer for the radio terminal 3 that belongs to the cell 10 of other radio station 1.

Figure 4:
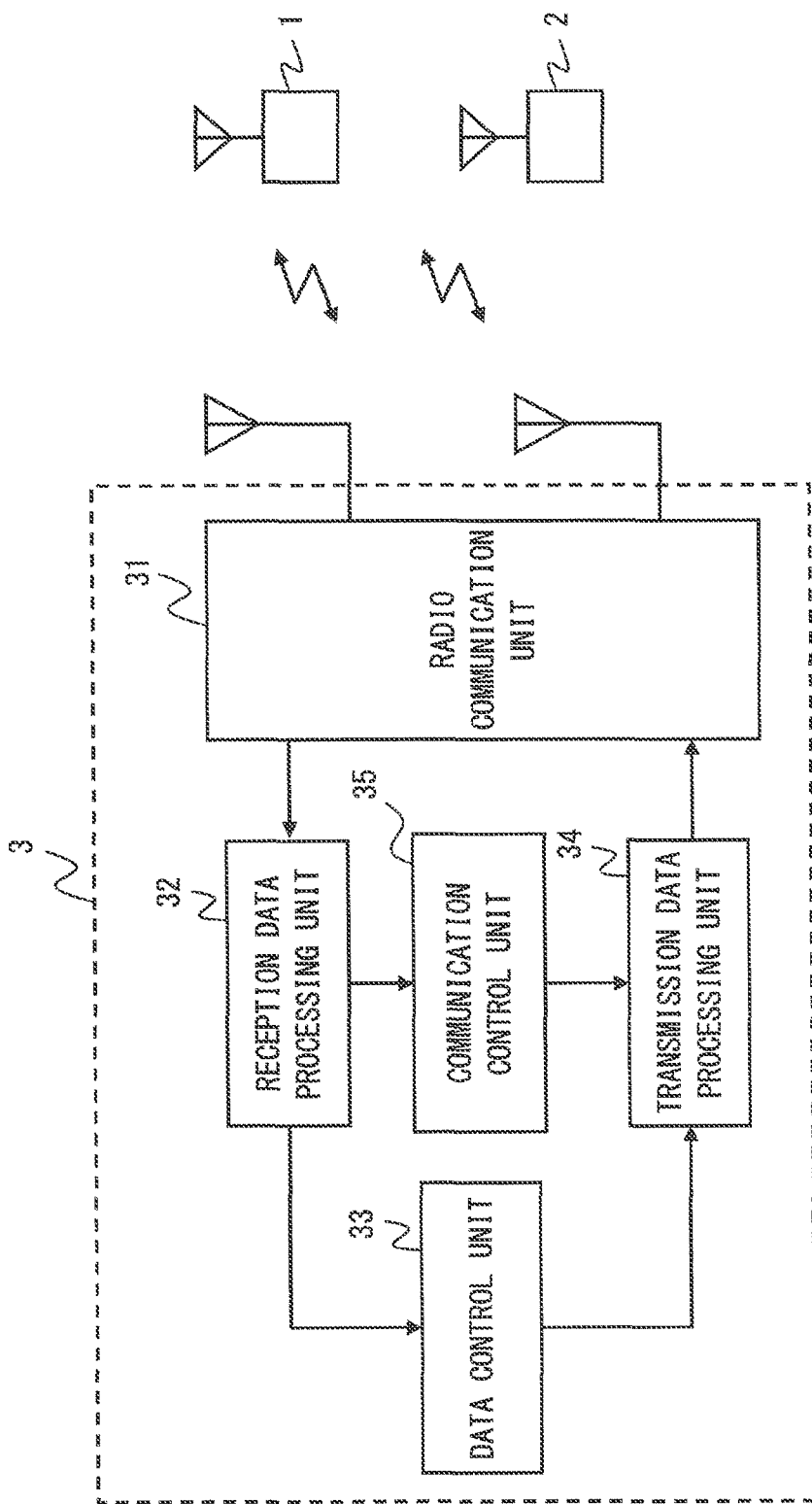
FIG. 4 is a diagram showing a configuration example of a radio terminal according to the first embodiment.

FIG. 4 is a block diagram showing a configuration example of the radio terminal 3. A radio communication unit 31 supports carrier aggregation of cells operated by different radio stations, and is capable of simultaneously using the cells (e.g., the cells 10 and 20) for user data transmission or reception. Specifically, the radio communication unit 31 receives downlink signals from one or both of the radio station 1 and the radio station 2 via an antenna. A reception data processing unit 32 reconstructs reception data from any received downlink signal and sends the reception data to a data control unit 33. The data control unit 33 uses the reception data according to the purpose thereof. A transmission data processing unit 34 and the radio communication unit 31 generate an uplink signal using transmission data supplied from the data control unit 33, and transmit the uplink signal to one or both of the radio stations 1 and the radio station 2.

In order to enable the radio communication unit 31 to simultaneously use the cells 10 and 20 for receiving or transmitting signals (e.g., user data or a control signal), the communication control unit 35 of the radio terminal 3 performs setup relating to the second bearer (e.g., EPS RB setup, EPS bearer setup) in response to an instruction from the radio station 1 or the radio station 2. Thus, the radio terminal 3 can communicate also with the radio station 2 while communicating (i.e., performing one or both of transmission and reception of user data) with the radio station 1. In one example, the communication control unit 35 may receive an instruction to initiate use of the second cell 20 from the first radio station 1.

Figure 5:
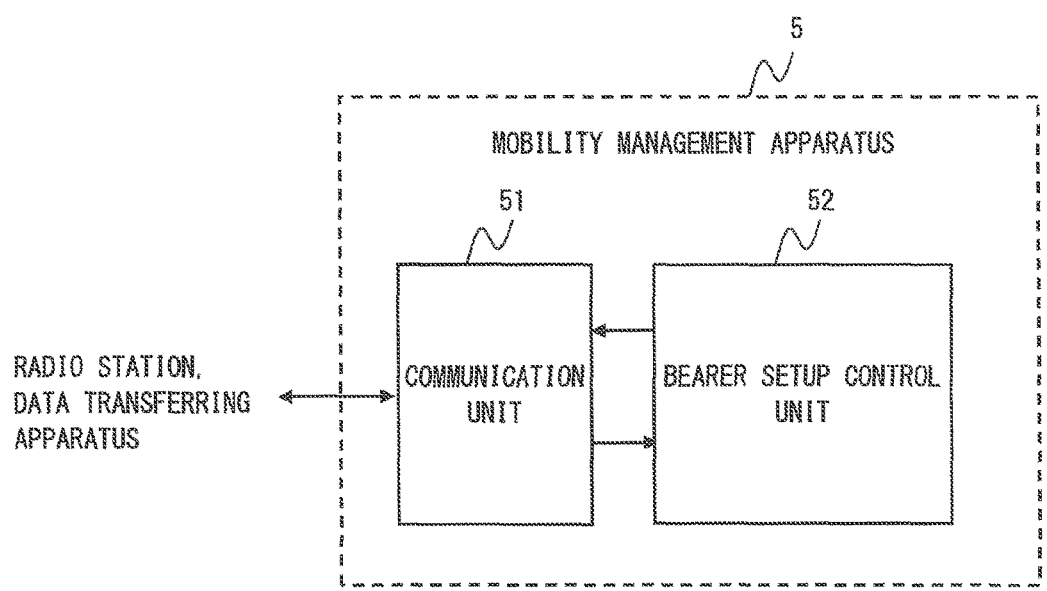
FIG. 5 is a diagram showing a configuration example of a mobility management apparatus according to the first embodiment.

FIG. 5 is a block diagram showing a configuration example of the mobility management apparatus 5 arranged in the upper network 4. The communication unit 51 communicates with the radio stations 1 and 2, and also communicates with the data transferring apparatus 6 which will be described later. The bearer setup control unit 52 communicates with the radio stations 1 and 2 and the data transferring apparatus 6 via the communication unit 51, and controls setup of bearers in such apparatuses. Specifically, the bearer setup control unit 52 requests the data transferring apparatus 6 to set up a bearer in response to a bearer setup request for the second bearer from the radio station 1 or 2, and notifies the radio station 1 or the radio station 2 of bearer configuration information relating to the second bearer.

Normally, the radio terminal 3 is managed as being associated with the radio station (e.g., the radio station 1) in the upper network 4 while being connected with the upper network 4. For example, for the purpose of identifying the radio terminal 3 in the control connection with the radio station 1, the mobility management apparatus 5 may assign, to the radio terminal 3, a network identifier (e.g., an MME UE S1AP ID) associated with the radio station 1. In the normal CA in which a single radio station (e.g., the radio station 1) operates a plurality of cells, the upper network 4 is only required to manage the radio terminal 3 by associating the radio terminal 3 with the radio station 1, as in the normal manner. Meanwhile, in the case of CA in which the cells 10 and 20 of the different radio stations 1 and 2 are used, the upper network 4 is required to manage the radio terminal 3 by associating with the plurality of radio stations 1 and 2. Accordingly, the mobility management apparatus 5 may assign a plurality of network identifiers to a single radio terminal 3. A plurality of network identifiers includes a first identifier for identifying the radio terminal 3 in a control connection between the upper network 4 and the radio station 1, and a second identifier for identifying the radio terminal 3 in a control connection between the upper network 4 and the radio station 2. Further, two types of network identifier (e.g., an MME UE S1AP ID and an eNB UE S1AP ID) may be assigned to the radio terminal 3. With regard to the first one of the two types of network identifiers (e.g., an MME UE S1AP ID), a single identifier may be assigned to the radio terminal 3. Meanwhile, with regard to the second one of the two types of network identifiers (e.g., an eNB UE S1AP ID), one identifier may be assigned to the control connection between the upper network 4 and the radio station 1, and another identifier further assigned to the control connection between the upper network 4 and the radio station 2.

Figure 6:
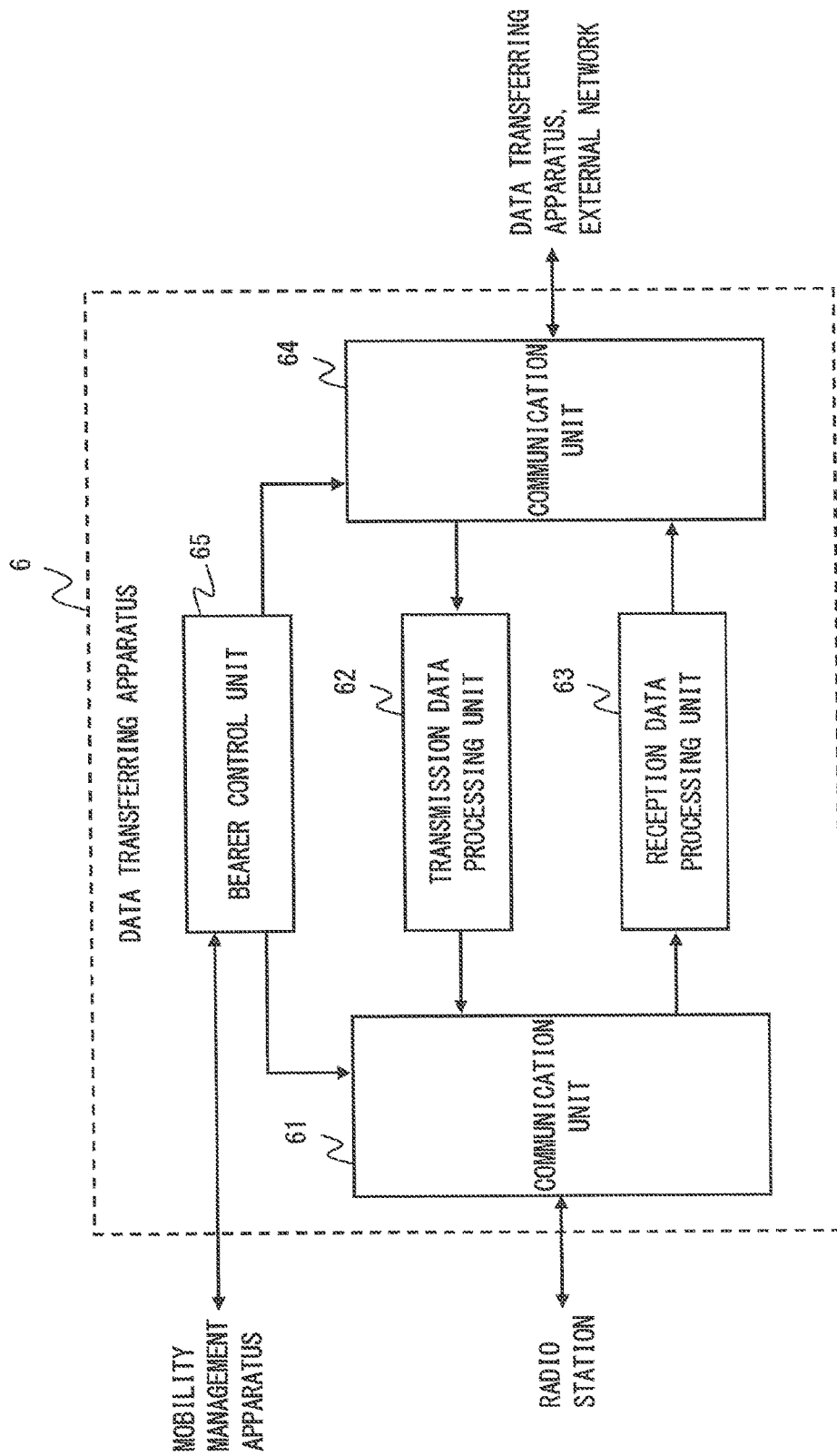
FIG. 6 is a diagram showing a configuration example of a data transferring apparatus according to the first embodiment.

FIG. 6 is a block diagram showing a configuration example of the data transferring apparatus 6 arranged in the upper network 4. A communication unit 61 sets up the first and second bearers (e.g., S1 bearers) associated with the radio stations 1 and 2, and sends and receives user data to and from the radio stations 1 and 2. A communication unit 64 sets up a bearer (e.g., an S5/S8 bearer or an external bearer) associated with other data transferring apparatus in the upper network 4 or associated with the external network, and sends and receives user data to and from the other data transferring apparatus or the external network.

A transmission data processing unit 62 receives downlink user data from the communication unit 64, and forwards the downlink user data based on the mapping between an upstream bearer and a downstream bearer (e.g., an S5/S8 bearer and an S1 bearer). A reception data processing unit 63 receives uplink user data from the communication unit 61, and forwards the uplink user data based on the mapping between the two bearers (e.g., an S5/S8 bearer and an S1 bearer).

The bearer control unit 65 performs signaling with the mobility management apparatus 5, and sets up the first and second bearers (e.g., S1 bearers) between the communication unit 61 and the radio stations 1 and 2, and also sets up the bearer (e.g., an S5/S8 bearer or an external bearer) associated with other data transferring apparatus or the external network, in accordance with control from the mobility management apparatus 5.

In the following, a description will be given of specific exemplary procedures of setting up the first and second bearers in order to enable the radio terminal 3 to simultaneously use the cells 10 and 20 for receiving or transmitting signals (e.g., user data or control information). The first exemplary procedure will be described with reference to FIGS. 7 to 11 firstly, then the second exemplary procedure will be described with reference to FIGS. 12 to 15, and finally the third exemplary procedure will be described with reference to FIGS. 16 to 19.

First Exemplary Procedure

Figure 7:
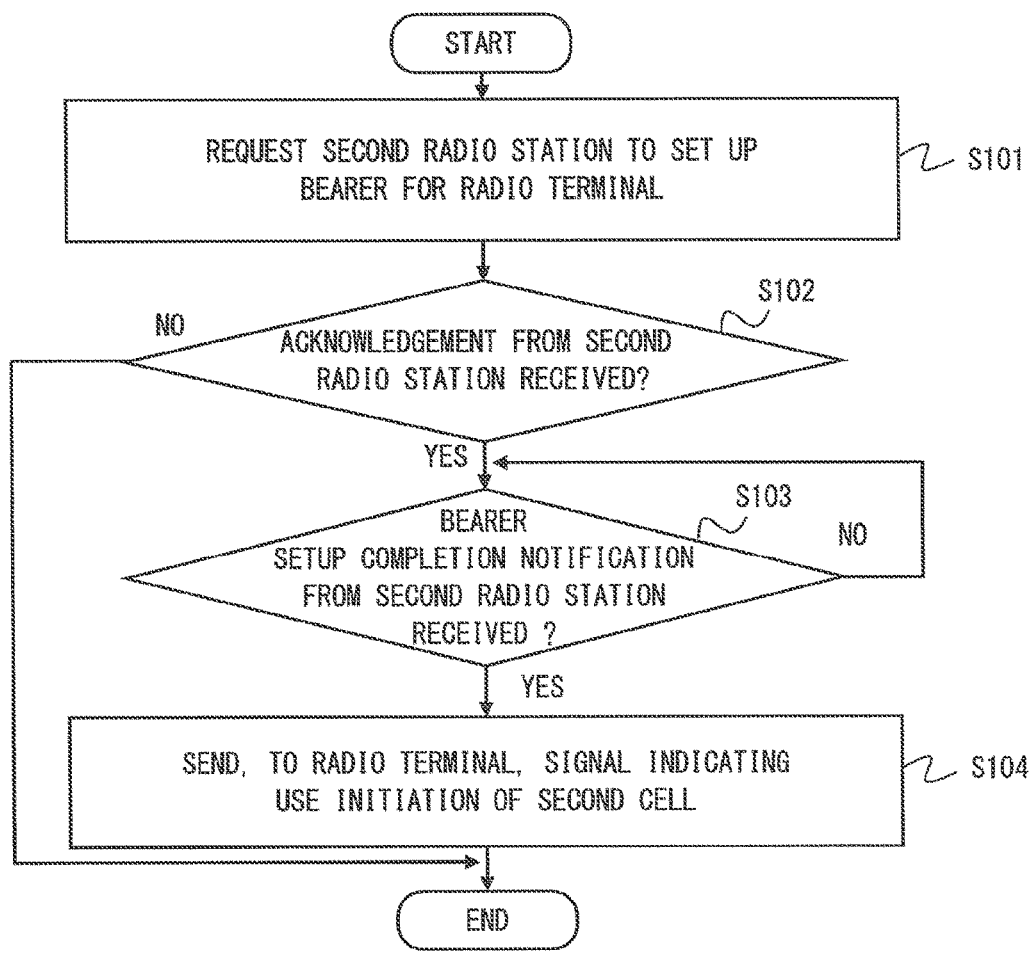
FIG. 7 is a flowchart showing an example of an operation of the first radio station according to the first embodiment (first exemplary procedure)

FIG. 7 is a flowchart showing an operation of the radio station 1 according to the first exemplary procedure. In Step S101, the radio station 1 (communication control unit 15) sends, to the radio station 2, a request to set up the second bearer for the radio terminal 3 belonging to its own cell 10, to thereby trigger setup of the second bearer. In Step S102, the radio station 1 determines whether an acknowledgment to the request in Step S101 has been received from the radio station 2. When no acknowledgment has been received (NO in Step S102), the radio station 1 ends the process in FIG. 7. On the other hand, when the acknowledgment has been received (YES in Step S102), the radio station 1 determines whether a bearer setup completion notification has been received from the radio station 2 (Step S103). This completion notification represents completion of the setup of the second bearer. When the bearer setup completion notification has been received (YES in Step S103), the radio station 1 sends, on the cell 10 and to the radio terminal 3, an instruction to initiate use of the cell 20 (Step S104).

Figure 8:
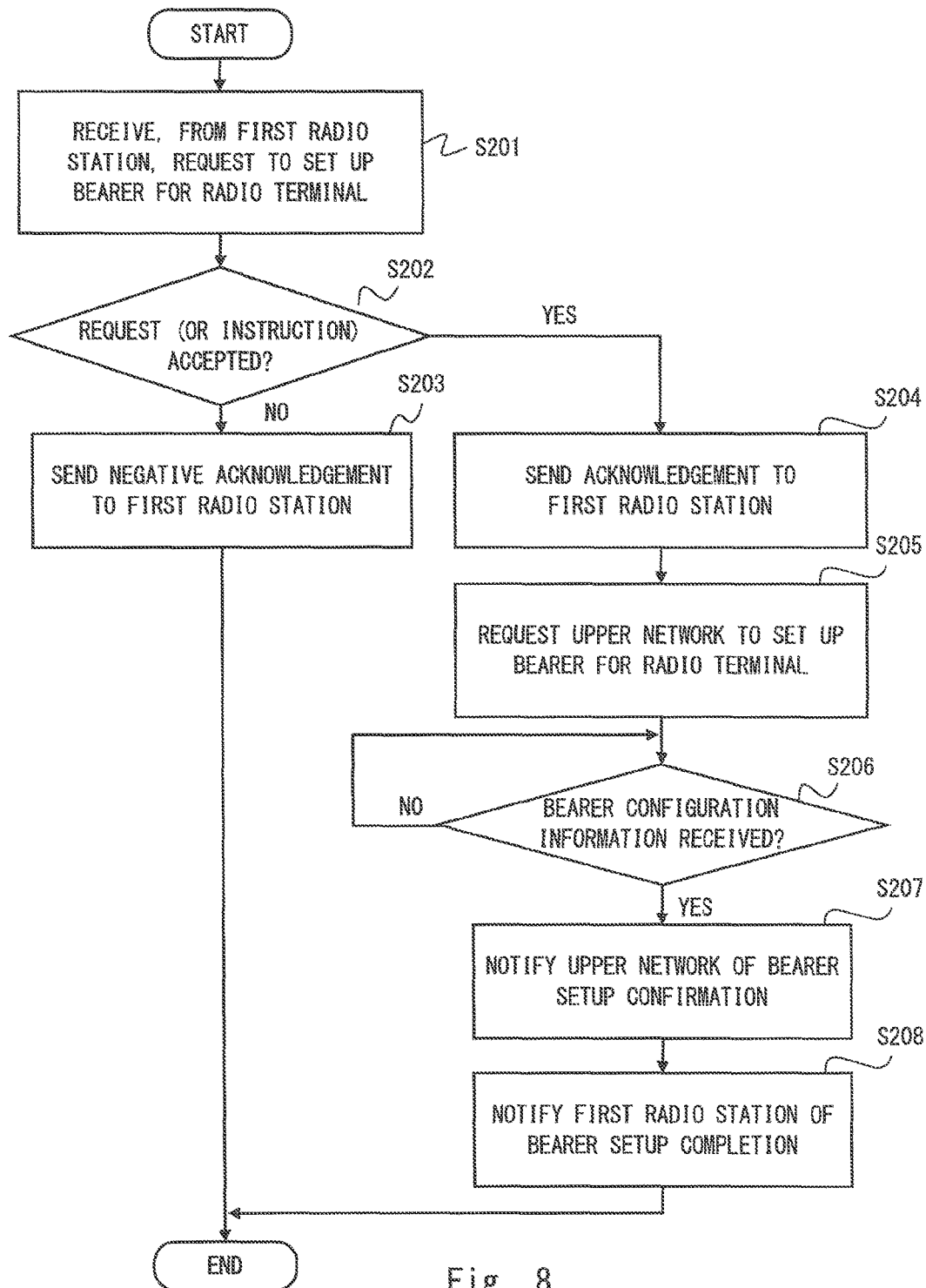
FIG. 8 is a flowchart showing an example of an operation of the second radio station according to the first embodiment (first exemplary procedure)

FIG. 8 is a flowchart showing an operation of the radio station 2 according to the first exemplary procedure. In Step S201, the radio station 2 (communication control unit 25) receives, from the radio station 1, a message that requests setup of the second bearer for communicating on the cell 20 with the radio terminal 3 belonging to the cell 10. In Step S202, the radio station 2 determines whether or not to accept the request from the radio station 1. For example, if the radio station 2 cannot prepare radio resource for communicating with the radio terminal 3 because of high load of the cell 20, then the radio station 2 may reject the request from the radio station 1. The radio station 2 sends a negative acknowledgment to the radio station 1 when rejecting the request from the radio station 1 (Step S203), and sends an acknowledgment to the radio station 1 when accepting the request (Step S204).

When the radio station 2 accepts the request from the radio station 1, the radio station 2 prepares for communication on the cell 20 with the radio terminal 3. Specifically, in Step S205, the radio station 2 requests the upper network 4 (mobility management apparatus 5) to setup the second bearer for the radio terminal 3. In Step S206, the radio station 2 determines whether bearer configuration information has been received from the upper network 4. When the bearer configuration information has been received (YES in Step S206), the radio station 2 performs bearer setup relating to the second bearer (e.g., S1 bearer setup, EPS RB setup) based on the bearer configuration information. Then, the radio station 2 sends a confirmation notification for bearer setup to the upper network 4 (Step S207). Finally, the radio station 2 notifies the radio station 1 of completion of the setup of the second bearer (Step S208). The bearer setup confirmation notification includes, for example, a bearer endpoint identifier for downlink data reception that is set at the radio station 2.

Figure 9:
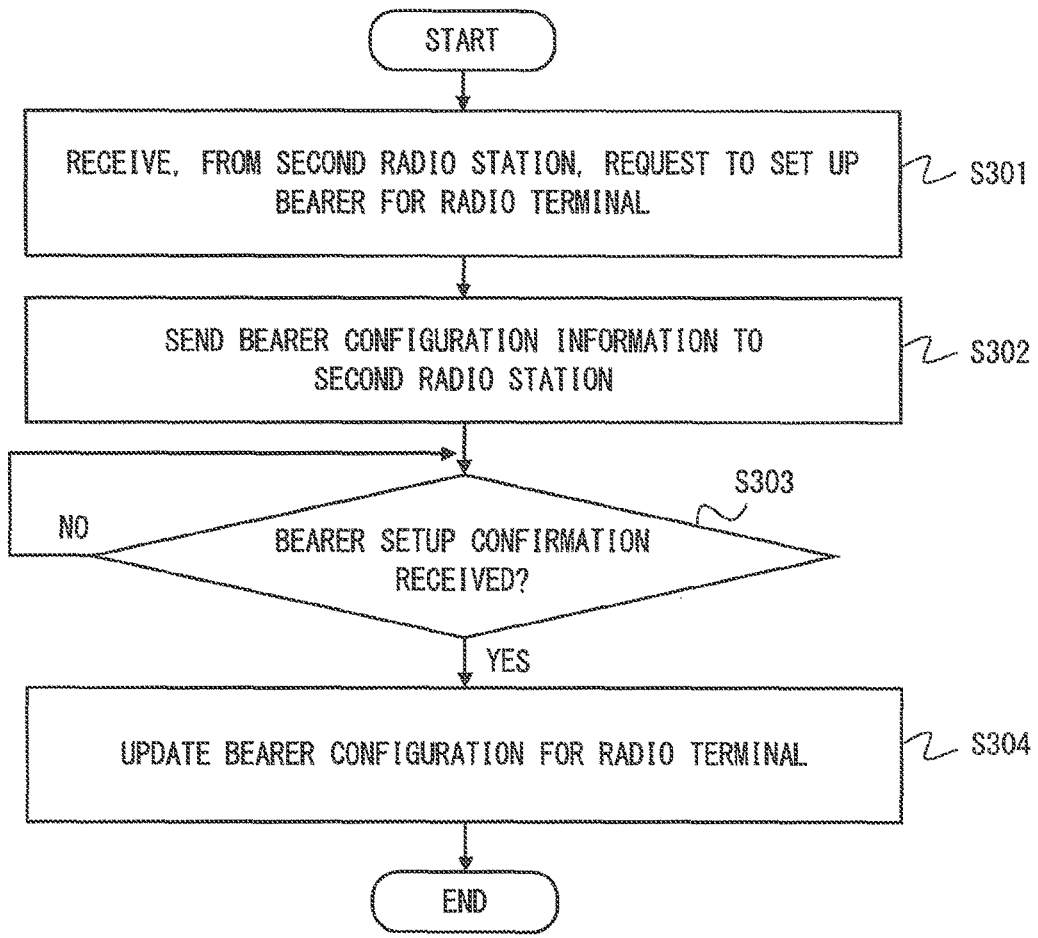
FIG. 9 is a flowchart showing an example of an operation of an upper network according to the first embodiment (first exemplary procedure)

FIG. 9 is a flowchart showing an operation of the upper network 4 according to the first exemplary procedure. In Step S301, the upper network 4 (mobility management apparatus 5) receives, from the radio station 2, a request to set up the second bearer for the radio terminal 3. The upper network 4 sends bearer configuration information to the second radio station 2 in response to the request in Step S301 (Step S302). In Step S303, the upper network 4 determines whether a bearer setup confirmation notification has been received from the second radio station 2. When the bearer setup confirmation notification has been received (YES in Step S303), the upper network 4 updates bearer configuration in the data transferring apparatus 6, based on the confirmation notification, and completes the setup of the second bearer (Step S304).

Figure 10:
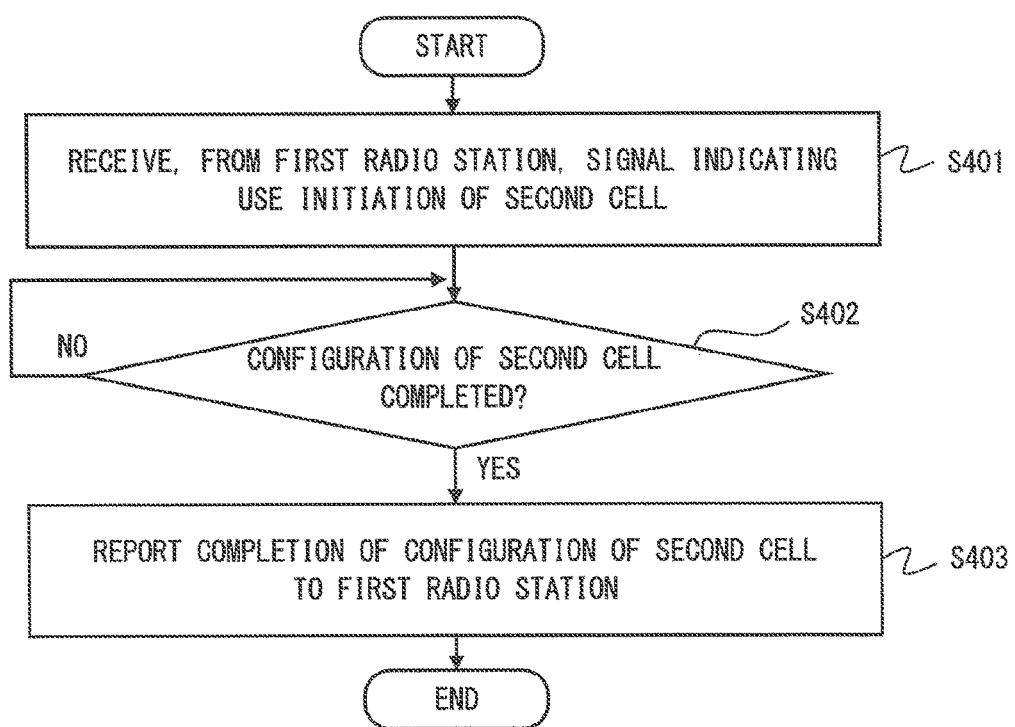
FIG. 10 is a flowchart showing an example of an operation of the radio terminal according to the first embodiment (first exemplary procedure)

FIG. 10 is a flowchart showing an operation of the radio terminal 3 according to the first exemplary procedure. In Step S401, the radio terminal 3 (communication control unit 35) receives, on the cell 10 and from the first radio station 1, an instruction to initiate use of the second cell 20. In Step S402, the radio terminal 3 configures the second cell 20 in response to the use initiation instruction. Specifically, the radio terminal 3 may perform configuration required in transmitting or receiving user data through the second bearer (e.g., address configuration of the radio terminal 3, EPS bearer endpoint configuration, radio bearer configuration and the like). At this time, the radio station 1 may further send radio resource control configuration information (Radio Resource Control (RRC) Configuration), radio resource configuration information (Radio Resource Configuration) and the like. In Step S403, the radio terminal 3 reports, to the first radio station 1, completion of configuration of the second cell 20.

Figure 11:
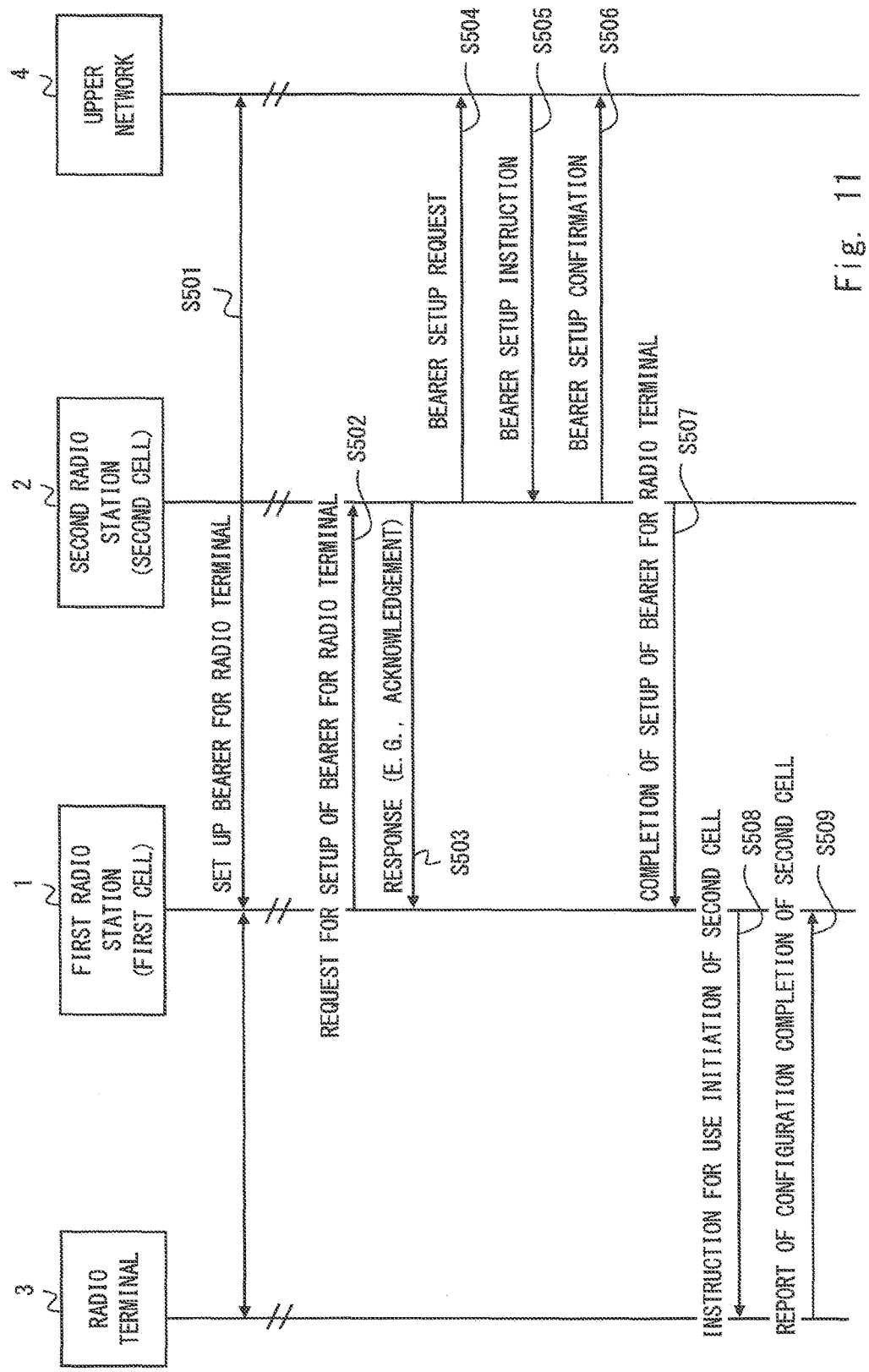
FIG. 11 is a sequence diagram showing an example of a bearer control method in the radio communication system according to the first embodiment (first exemplary procedure)

FIG. 11 is a sequence diagram showing the entire first exemplary procedure. In Step S501, the radio terminal 3, the radio station 1, and the upper network 4 set up the control bearer for sending and receiving control information on the cell 10 via the radio station 1. Further, the radio terminal 3, the radio station 1, and the upper network 4 may set up the first bearer for sending and receiving user data on the cell 10 via the radio station 1. In Step S502, the radio station 1 requests the radio station 2 to set up the second bearer for the radio terminal 3. The second bearer is a bearer (e.g., an E-RAB) for sending and receiving user data via the cell 20 and the radio station 2, and the second bearer includes a bearer (e.g., an S1 bearer) for transferring user data between the upper network 4 and the radio station 2. In Step 503, the radio station 2 sends, to the radio station 1, an acknowledgment or a negative acknowledgment to the bearer setup request. When the acknowledgment is sent in Step S503, the radio station 2 sends a setup request of the second bearer to the upper network 4. The upper network 4 (mobility management apparatus 5) controls setup of the second bearer in the data transferring apparatus 6, in response to the request from the radio station 2. Then, in Step S505, the upper network 4 (mobility management apparatus 5) instructs the radio station 2 about setup relating to the second bearer. This instruction includes bearer configuration information relating to the second bearer.

The radio station 2 performs setup relating to the second bearer based on the bearer configuration information, and sends a bearer setup confirmation notification to the upper network 4 (Step S506). Further, the radio station 2 notifies the radio station 1 of completion of setup of the second bearer (Step S507). In response to the s completion of setup of the second bearer, the radio station 1 sends, on the cell 10 and to the radio terminal 3, a notification of use initiation of the second cell 20 (Step S508). Finally, in Step S509, the radio terminal 3 transmits, to the radio station 1, a report of configuration completion of the cell 20.

In Step S502 in FIG. 11, when issuing the bearer setup request, the radio station 1 may send the following information:
- terminal individual information: e.g., radio terminal capability information, radio terminal identifier information, selected network information, bearer information, radio resource control information, radio terminal mobility history information, service information, or any combination thereof;
- initial terminal information: e.g., radio terminal identifier information, selected network information, radio terminal area information, radio connection purpose (cause), non-access stratum data, or any combination thereof; and
- non-access stratum information: e.g., radio terminal identifier information, selected network information, non-access stratum data, or any combination thereof.

Such information may be sent with the request (i.e., by the same message), or may be sent by a separate message.

In Step S507 in FIG. 11, when issuing the completion notification of setup of the second bearer, the radio station 2 may send the following information:
- terminal individual information: e.g., radio terminal capability information, radio terminal identifier information, selected network information, bearer information, radio resource control information, radio terminal mobility history information, service information, or any combination thereof; and
- non-access stratum information: e.g., radio terminal identifier information, selected network information, non-access stratum data, or any combination thereof.

Such information may be sent with the notification (i.e., by the same message), or may be sent by a separate message.

In Step S505 in FIG. 11, when issuing the setup instruction of the second bearer, the upper network 4 may send, as the bearer configuration information, (a) bearer information, (b) radio terminal capability information, (c) radio terminal identifier information, (d) selected network information, (e) security information, or any combination thereof. Such information may be sent with the instruction (i.e., by the same message), or may be sent by a separate message.

Second Exemplary Procedure

Figure 12:
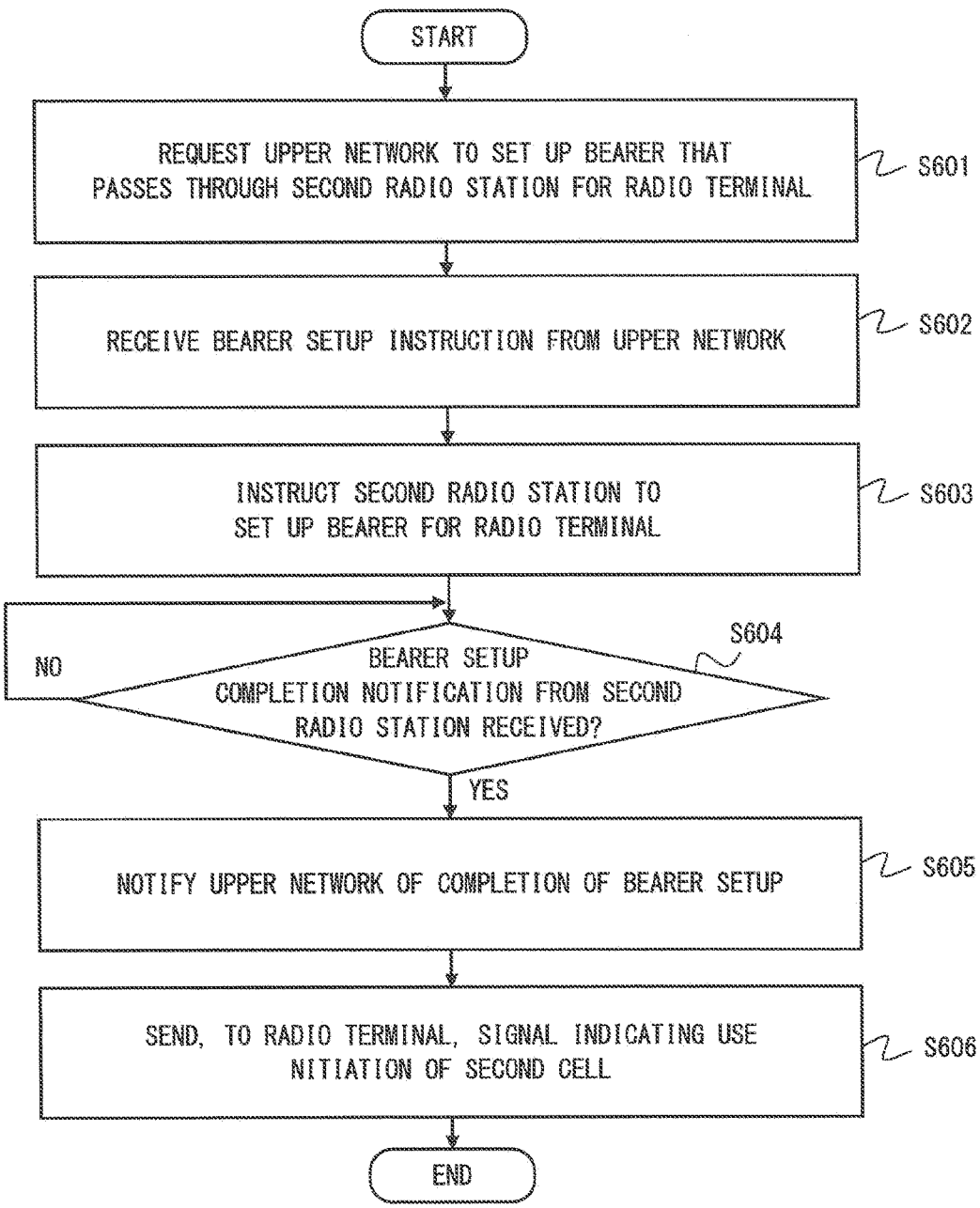
FIG. 12 is a flowchart showing an example of an operation of the first radio station according to the first embodiment (second exemplary procedure)

FIG. 12 is a flowchart showing an operation of the radio station 1 according to the second exemplary procedure. In Step S601, the radio station 1 (communication control unit 15) sends, to the upper network 4, a request to set up the second bearer for the radio terminal 3 belonging to its own cell 10, to thereby trigger the setup of the second bearer. In Step S602, the radio station 1 receives a setup instruction of the second bearer from the upper network 4. In Step S603, the radio station 1 instructs the radio station 2 to set up the second bearer for the radio terminal 3. In Step S604, the radio station 1 determines whether the bearer setup completion notification has been received from the radio station 2. When the bearer setup completion notification has been received (YES in Step S103), the radio station 1 notifies the upper network 4 of the completion of setup of the second bearer. Further, the radio station 1 sends, on the cell 10 and to the radio terminal 3, an instruction of use initiation of the cell 20 (Step S606). At this time, the radio station 1 may further send radio resource control configuration information (RRC Configuration), radio resource configuration information (Radio Resource Configuration) or the like.

Figure 13:
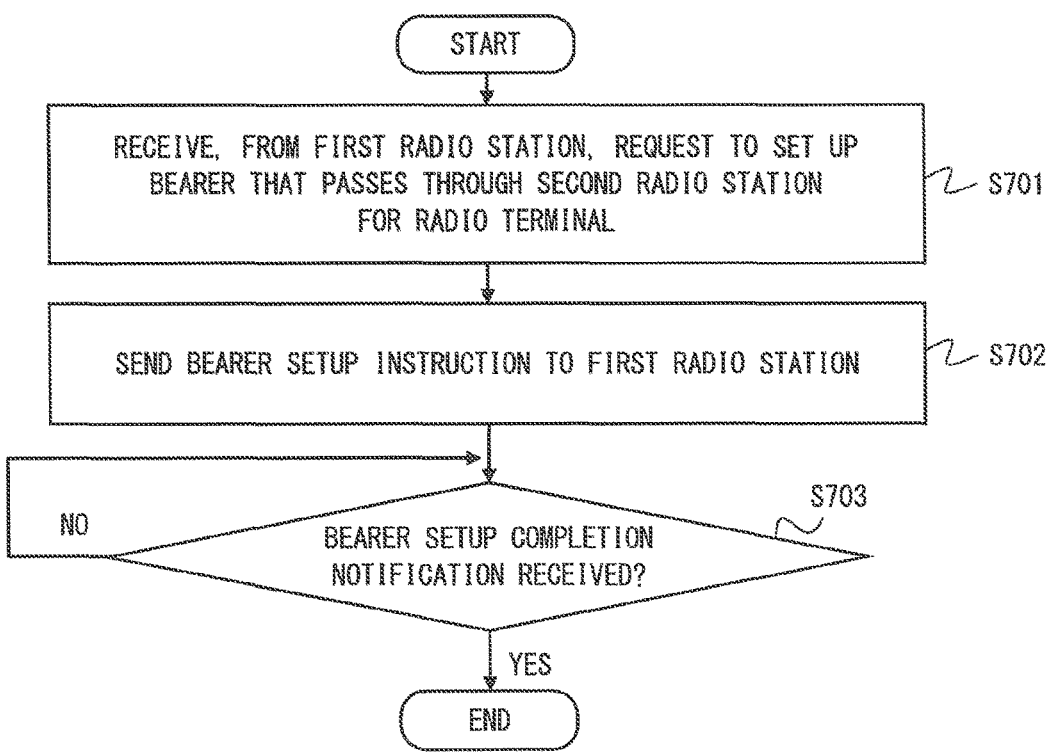
FIG. 13 is a flowchart showing an example of an operation of the upper network according to the first embodiment (second exemplary procedure)

FIG. 13 is a flowchart showing an operation of the upper network 4 according to the second exemplary procedure. In Step S701, the upper network 4 (mobility management apparatus 5) receives, from the radio station 1, a request to set up the second bearer for the radio terminal 3. In Step S702, the upper network 4 sends a setup instruction of the second bearer to the radio station 1. The setup instruction includes bearer configuration information relating to the second bearer. In Step S703, the upper network 4 determines whether a bearer setup completion notification has been received from the radio station 1. The bearer setup completion notification includes, for example, a bearer endpoint identifier for downlink data reception that is set at the radio station 2. The upper network 4 may update the bearer configuration in the data transferring apparatus 6, based on the completion notification.

Figure 14:
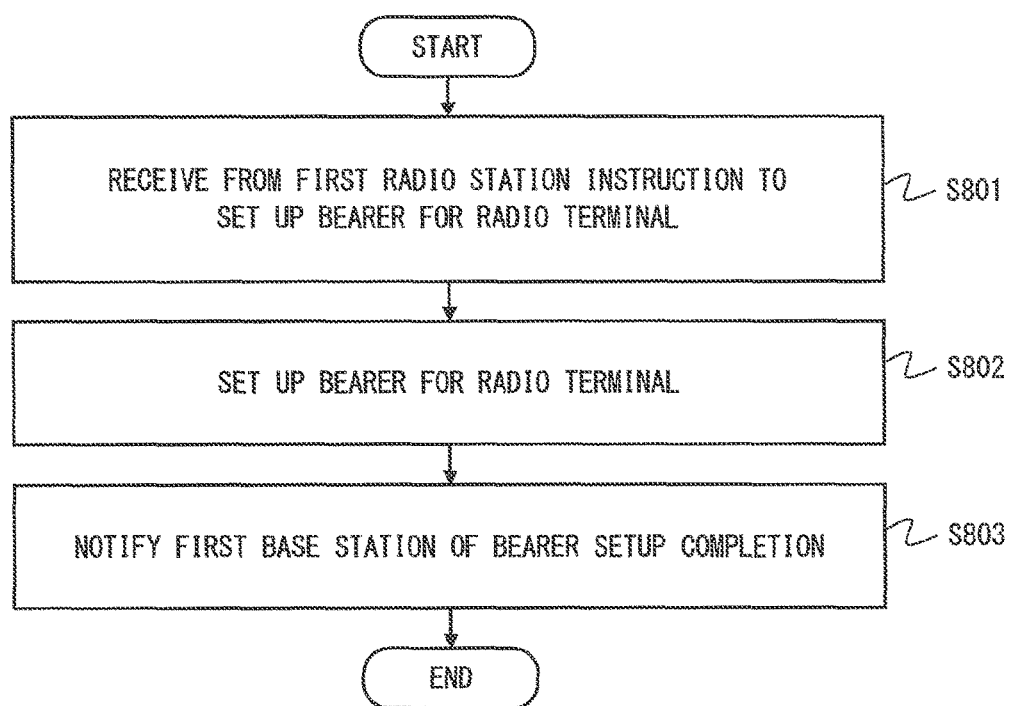
FIG. 14 is a flowchart showing an example of an operation of the second radio station according to the first embodiment (second exemplary procedure)

FIG. 14 is a flowchart showing an operation of the radio station 2 according to the second exemplary procedure. In Step S801, the radio station 2 (communication control unit 25) receives a setup instruction of the second bearer from the radio station 1. The setup instruction includes bearer configuration information relating to the second bearer. In Step S802, the radio station 2 performs bearer setup (e.g., S1 bearer setup, EPS RB setup) relating to the second bearer, based on the bearer configuration information. In Step S803, the radio station 2 notifies the radio station 1 of completion of setup of the second bearer.

The operation of the radio terminal 3 according to the second exemplary procedure is similar to the operation according to the first exemplary procedure shown in FIG. 10.

Figure 15:
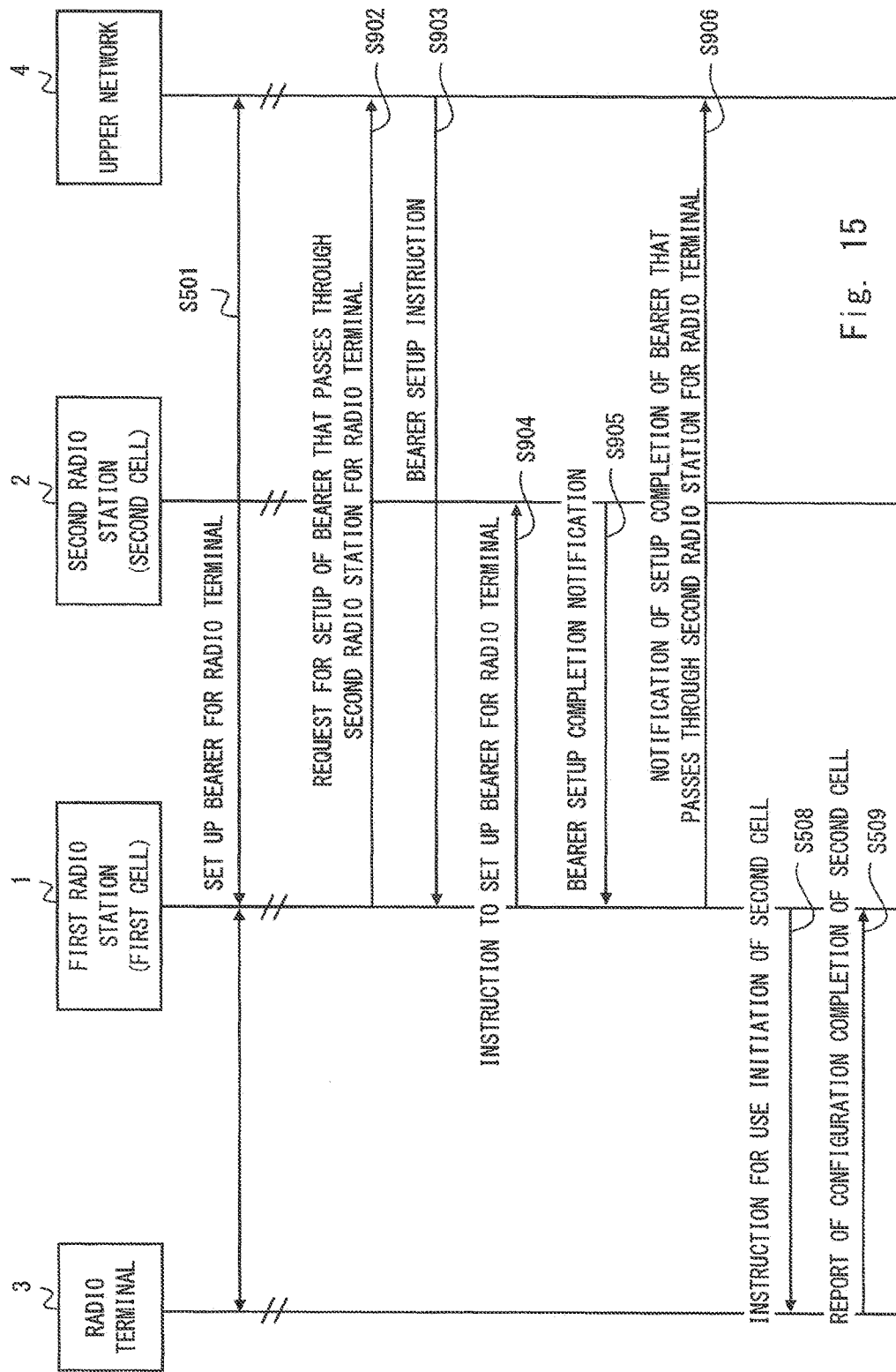
FIG. 15 is a sequence diagram showing an example of a bearer control method in the radio communication system according to the first embodiment (second exemplary procedure)

FIG. 15 is a sequence diagram showing the entire second exemplary procedure. The process in Step S501 in FIG. 15 is similar to that in Step S501 according to the first exemplary procedure shown in FIG. 11. In Step S902, the radio station 1 requests the upper network 4 to set up the second bearer for the radio terminal 3, that is, to set up the bearer that transfers user data via the cell 20 and the radio station 2. In response to the request from the radio station 2, the upper network 4 (mobility management apparatus 5) controls setup relating to the second bearer in the data transferring apparatus 6. Then, in Step S903, the upper network 4 (mobility management apparatus 5) instructs the radio station 1 about setup relating to the second bearer. The instruction includes bearer configuration information relating to the second bearer.

In Step S904, the radio station 1 instructs the radio station 2 to perform the setup of the second bearer. The radio station 2 performs setup relating to the second bearer based on the instruction from the radio station 1, and sends a bearer setup completion notification to the radio station 1 (Step S905). In Step S906, the radio station 1 sends, to the upper network 4, a completion notification of setup of the second bearer. The processes in Steps S508 and S509 in FIG. 15 are similar to those in Steps S508 and S509 according to the first exemplary procedure shown in FIG. 11.

When issuing the bearer setup request in Step S902 in FIG. 15, the radio station 1 may send the following information:

terminal individual information: e.g., radio terminal capability information, radio terminal identifier information, selected network information, bearer information, radio resource control information, radio terminal mobility history information, service information, or any combination thereof;

initial terminal information: e.g., radio terminal identifier information, selected network information, radio terminal area information, radio connection purpose (cause), non-access stratum data, or any combination thereof; and non-access stratum information: e.g., radio terminal identifier information, selected network information, non-access stratum data, or any combination thereof.

Further, the radio station 1 may send such information also when issuing the bearer setup instruction to the radio station 2 in Step S904 in FIG. 15. Such information may be sent with the request (i.e., by the same message), or may be sent by a separate message.

When issuing the setup instruction of the second bearer in Step S903 in FIG. 15, the upper network 4 may send, as the bearer configuration information, (a) bearer information, (b) radio terminal capability information, (c) radio terminal identifier information, (d) selected network information, (e) security information, or any combination thereof. Such information may be sent with the instruction (i.e., by the same message), or may be sent by a separate message.

Third Exemplary Procedure

Figure 16:
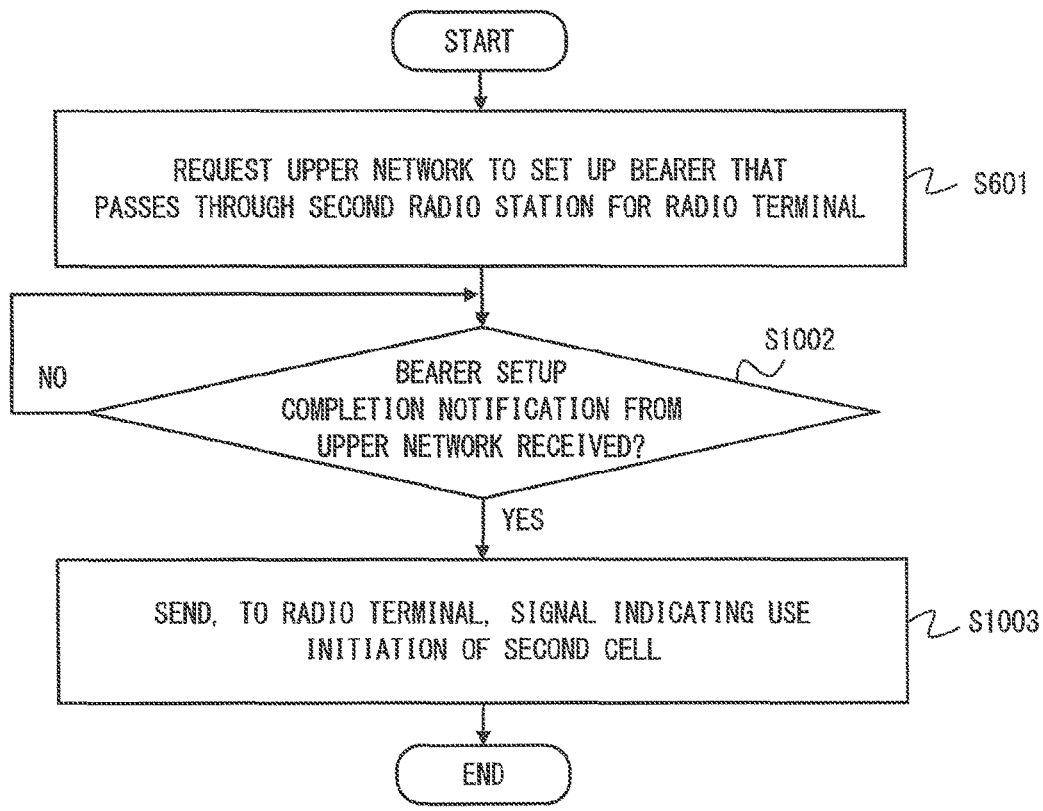
FIG. 16 is a flowchart showing an example of an operation of the first radio station according to the first embodiment (third exemplary procedure)

FIG. 16 is a flowchart showing an operation of the radio station 1 according to the third exemplary procedure. The process in Step S601 in FIG. 16 is similar to that in Step S601 according to the second exemplary procedure in FIG. 12. In the third exemplary procedure, in response to a setup request of the second bearer from the radio station 1 to the upper network 4, the upper network 4 communicates with the radio station 2, to set up the second bearer. Accordingly, in Step S1002, the radio station 1 determines whether a completion notification of setup of the second bearer has been received from the upper network 4. When the completion notification has been received (YES in Step S1002), the radio station 1 sends, on the first cell 10 and to the radio terminal 3, a signal indicating use initiation of the second cell 20 (Step S1003). At this time, the radio station 1 may further send radio resource control (RRC Configuration) information, radio resource configuration information (Radio Resource Configuration) or the like.

Figure 17:
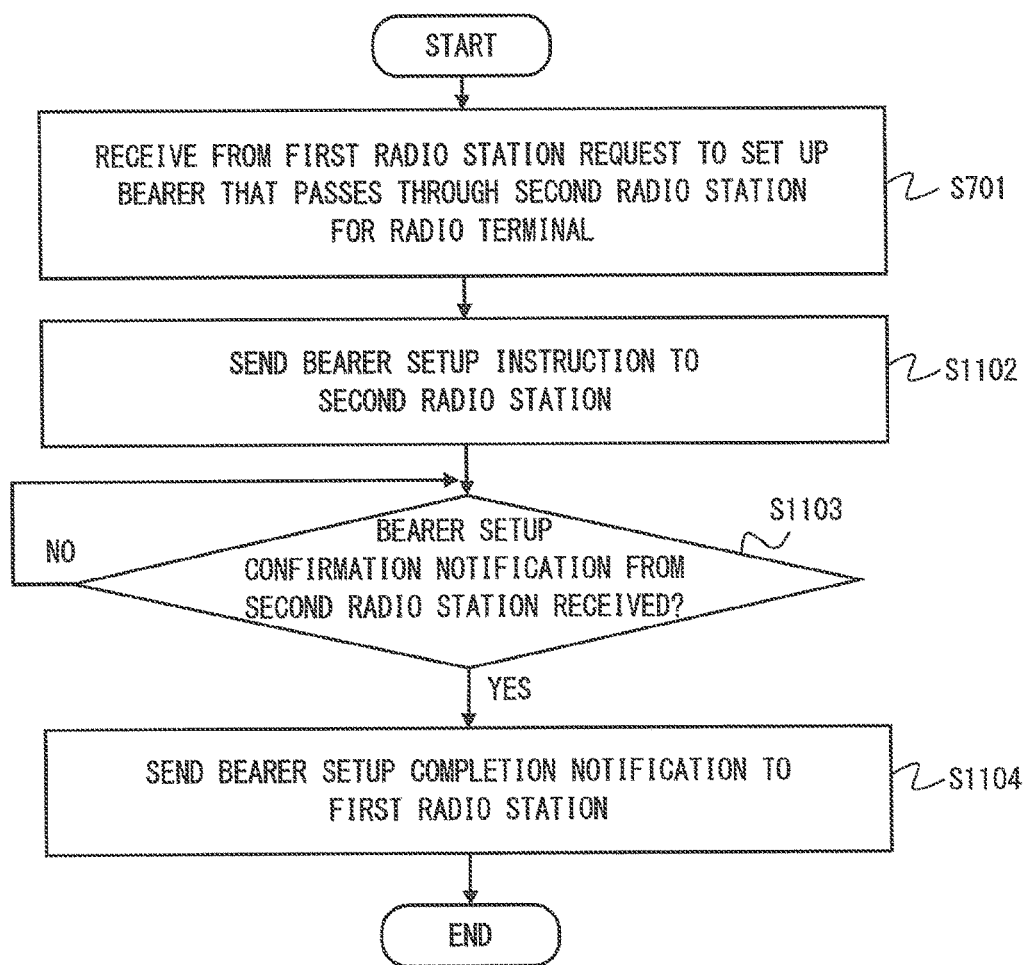
FIG. 17 is a flowchart showing an example of an operation of the upper network according to the first embodiment (third exemplary procedure)

FIG. 17 is a flowchart showing an operation of the upper network 4 according to the third exemplary procedure. The process in Step S701 in FIG. 17 is similar to the Step S701 according to the second exemplary procedure in FIG. 13. In Step S1102, the upper network 4 (mobility management apparatus 5) sends a setup instruction of the second bearer to the radio station 2. The setup instruction includes bearer configuration information relating to the second bearer. In Step S1103, the upper network 4 determines whether a bearer setup completion notification has been received from the radio station 2. The bearer setup completion notification includes, for example, a bearer endpoint identifier for downlink data reception that is set at the radio station 2. The upper network 4 may update the bearer configuration in the data transferring apparatus 6, based on the completion notification. When the completion notification has been received (YES in Step S1103), the upper network 4 notifies the radio station 1 of the bearer setup completion (Step S1104).

Figure 18:
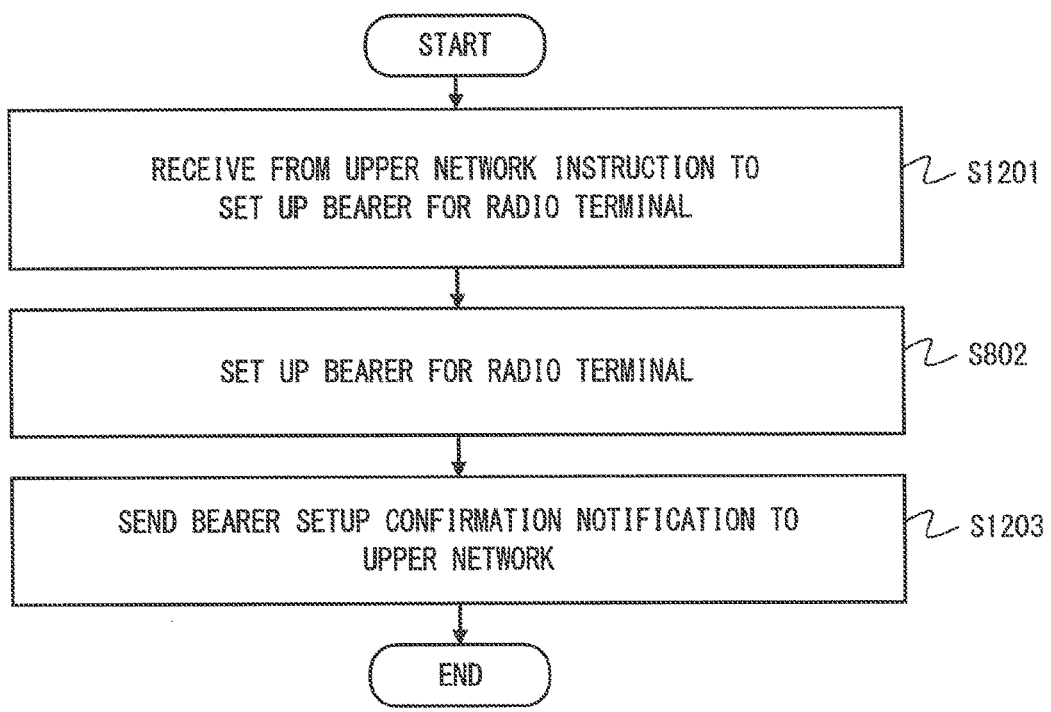
FIG. 18 is a flowchart showing an example of an operation of the second radio station according to the first embodiment (third exemplary procedure)

FIG. 18 is a flowchart showing an operation of the radio station 2 according to the third exemplary procedure. In Step S1201, the radio station 2 (communication control unit 25) receives a setup of the second bearer instruction from the upper network 4. The setup instruction includes bearer configuration information relating to the second bearer. Step S802 in FIG. 18 is similar to that in FIG. 14. That is, the radio station 2 performs bearer setup (e.g., S1 bearer setup, EPS RB setup) relating to the second bearer, based on the bearer configuration information. In Step S1203, the radio station 2 notifies the upper network 4 of completion of setup of the second bearer.

The operation of the radio terminal 3 according to the third exemplary procedure is similar to that according to the first exemplary procedure shown in FIG. 10.

Figure 19:
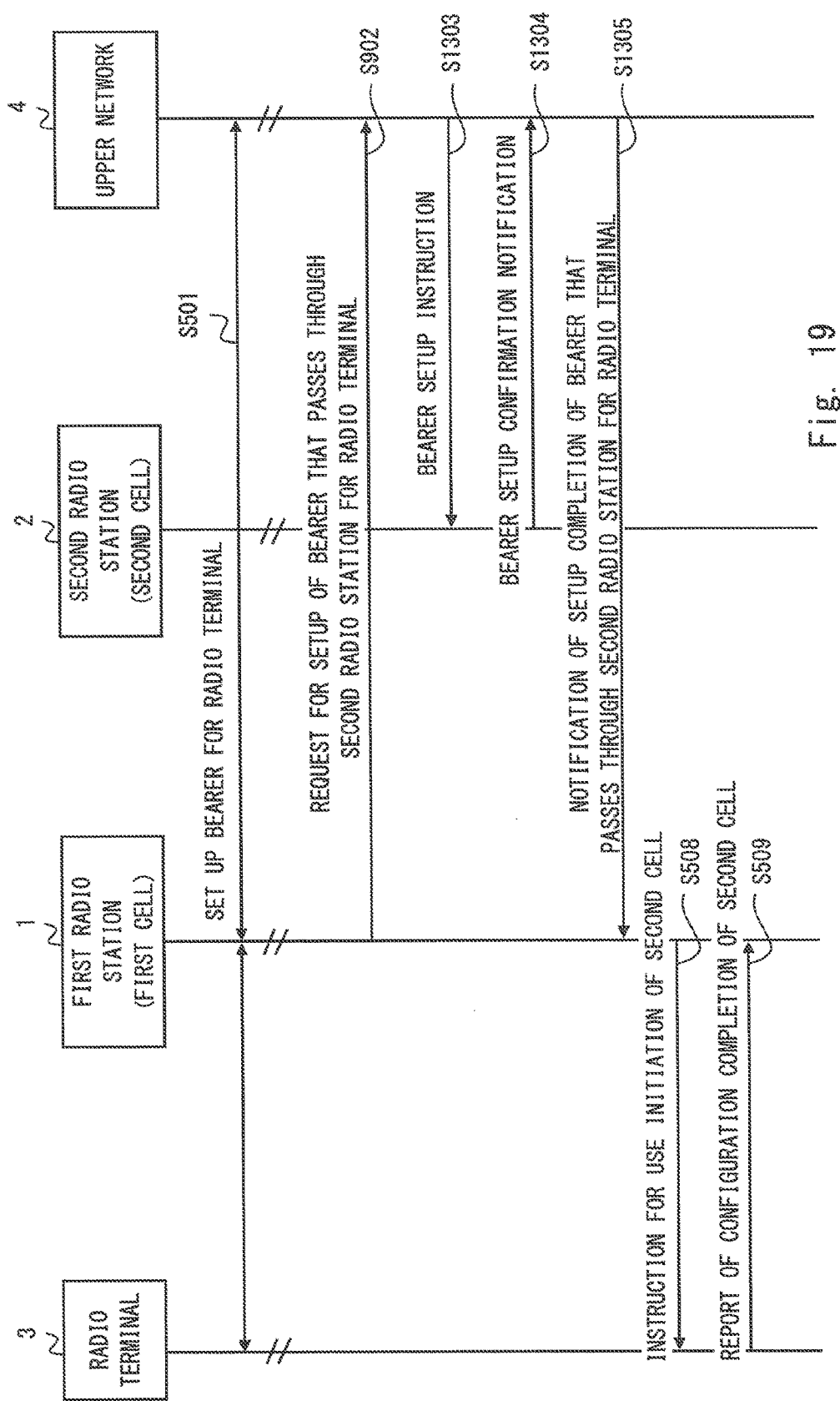
FIG. 19 is a sequence diagram showing an example of a bearer control method in the radio communication system according to the first embodiment (third exemplary procedure)

FIG. 19 is a sequence diagram showing the entire third exemplary procedure. The processes in Steps S501 and S902 in FIG. 19 are similar to those in Steps S501 and S902 according to the second exemplary procedure shown in FIG. 15. In Step S1303, the upper network 4 (mobility management apparatus 5) instructs the radio station 2 to perform setup relating to the second bearer. The instruction includes bearer configuration information relating to the second bearer. In Step S1304, the radio station 2 performs setup relating to the second bearer based on the instruction from the upper network 4, and sends a bearer setup completion notification to the upper network 4. In Step S1305, the upper network 4 sends, to the radio station 1, a completion notification of setup of the second bearer. The processes in Steps S508 and S509 in FIG. 19 are similar to those in Steps S508 and S509 according to the first exemplary procedure and the second exemplary procedure shown in FIGS. 11 and 15.

When issuing the setup instruction of the second bearer in Step S1303 in FIG. 19, the upper network 4 may send, as the bearer configuration information, (a) bearer information, (b) radio terminal capability information, (c) radio terminal identifier information, (d) selected network information, (e) security information, or any combination thereof. Such information may be sent with the instruction (i.e., by the same message), or may be sent by a separate message.

Second Embodiment

In the present embodiment, an example in which the first embodiment is applied to a 3GPP LTE system will be described. The radio stations 1 and 2 correspond to eNBs, the radio terminal 3 corresponds to a UE, and the upper network 4 corresponds to a core network (EPC). Further, the mobility management apparatus 5 included in the upper network 4 corresponds to an MME (Mobility Management Entity), and the data transferring apparatus 6 corresponds to an S-GW or the combination of an S-GW and a P-GW. Information exchange between radio stations (i.e., between eNBs) may be performed using X2 as a direct interface, may be performed using S1 as an interface via the core network, or may be performed using a newly defined interface (e.g., X3). Further, information exchange between a radio station (i.e., an eNB) and an upper network (i.e., an EPC) may be performed using S1 (also referred to as S1-MME, S1-U) as a direct interface, or may be performed using a newly defined interface. The first and second bearers each correspond to, for example, an S1 bearer, an E-RAB, or an EPS bearer. The control bearer corresponds to, for example, a UE-associated logical S1-connection, S1-MME, or a signaling radio bearer (Signaling Radio Bearer: SRB) for sending C-plane control information to a radio terminal (i.e., a UE) via a radio station (i.e., an eNB).

The radio terminal (UE) 3 supports carrier aggregation of cells operated by different radio stations (eNBs) (Inter-eNB CA). Note that, the "Inter-eNB CA" as used herein is not limited to the manner of simultaneously receiving or transmitting signals (e.g., user data or control information) actually on cells of different eNBs. Instead, it includes the manner of receiving or transmitting signals on actually on one of cells of different eNBs although the UE 3 can receive or transmit signals on both of the cells of the different eNBs, the manner of receiving or transmitting signals of different types on respective cells of different eNBs, or the manner of using each of the cells of different eNBs for one of signal reception and transmission.

Figure 20:
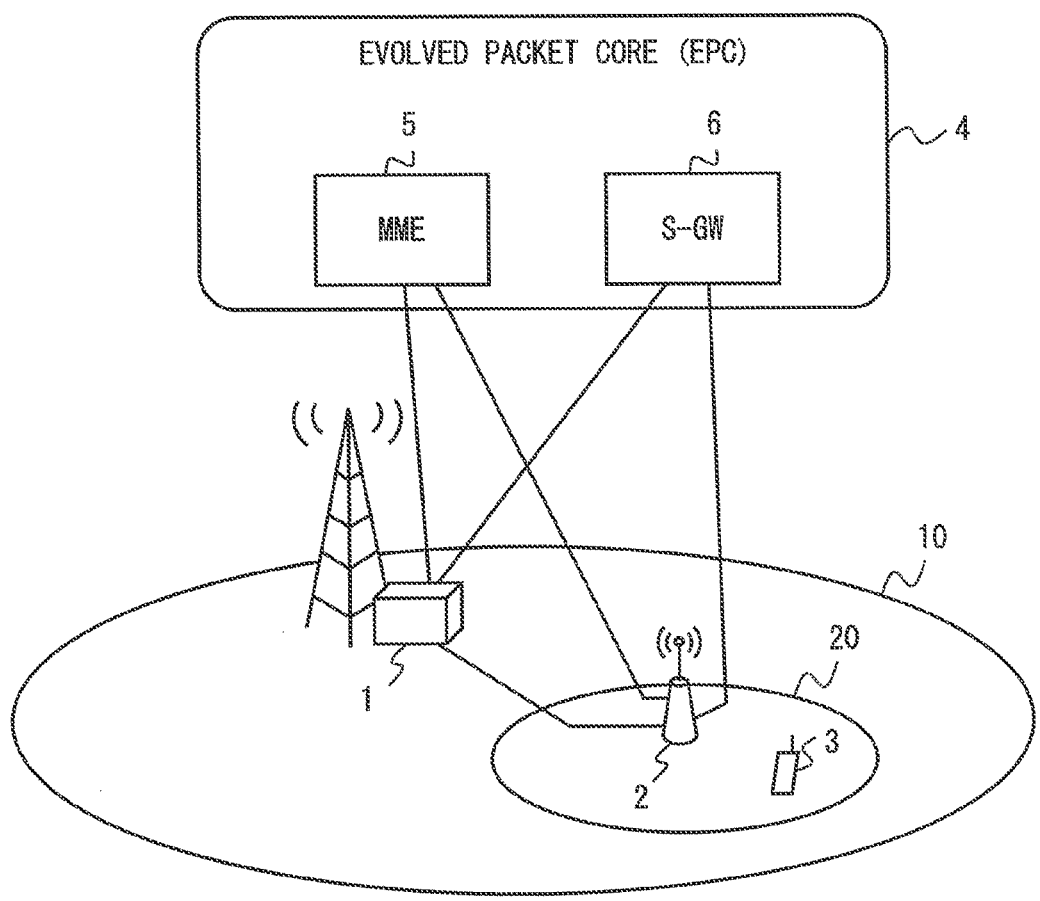
FIG. 20 is a diagram showing a configuration example of a radio communication system according to a second embodiment.

In the following, a description will be given regarding the radio stations 1 and 2 as eNBs 1 and 2, the radio terminal 3 as a UE 3, the upper network 4 as an EPC 4, the mobility management apparatus 5 as an MME 5, the data transferring apparatus 6 as an S-GW 6. FIG. 20 is a block diagram showing a configuration example of a radio communication system according to the present embodiment.

As has been described, in the LTE, a UE itself normally triggers setup of a bearer for transmission and reception of user data. However, in the case where the UE 3 has already established the first radio connection (RRC Connection Established) and bearer setup has been completed on the first cell of the eNB 1, the processing load on the UE 3 extremely increases when the setup of the second bearer is further performed on the second cell of other eNB 2. Addressing thereto, in the present embodiment, the eNB 1 triggers the setup of the second bearer, and the bearer setup is executed on the radio network side including the eNBs 1 and 2 and the EPC 4. Thus, the present embodiment can reduce the load on the UE 3 caused by processes required to perform carrier aggregation of the cells 10 and 20 operated by the different eNBs 1 and 2.

Which one of the eNB 1 and eNB 2 is to be used for downlink user data transmission may be determined, for example, based on the type of service or required QoS (or QCI). Further, control-related signals (Control Plane (CP) signal) may be transmitted from the eNB 1 and user data-related signals (User Plane (UP) signal) may be transmitted from the eNB 2.

The setup of the second bearer procedure according to the present embodiment may be similar to the first embodiment. That is, the eNB 1 sends a bearer setup request to one of the eNB 2 and the EPC 4, to thereby trigger setup of the second bearer. The EPC 4 controls the setup of the second bearer triggered by the eNB 1. Thus, the present embodiment can simultaneously set up bearers (e.g., a control bearer, an S1 bearer, an E-RAB, or an EPS bearer) for the UE 3 on the cells 10 and 20 for achieving carrier aggregation of the cells 10 and 20 operated by the different eNBs 1 and 2.

The setup of the second bearer may be carried out in accordance with any of fourth to sixth exemplary procedures which correspond to the first to third exemplary procedures described in the first embodiment. The fourth exemplary procedure corresponds to the first exemplary procedure according to the first embodiment. In the fourth exemplary procedure, the eNB 1 sends a bearer setup request to the eNB 2, to thereby trigger the eNB 2 to set up the second bearer. At this time, the eNB 1 may send at least one of terminal individual information (UE Context information), initial terminal information (Initial UE message), and non-access stratum information (NAS information) of the UE 3 relating to the setup of the second bearer. Next, the eNB 2 sends a setup request of the second bearer to the EPC 4 (MME 5). The EPC 4 carries out bearer setup in the EPC 4, and notifies the eNB 2 of bearer configuration information (Bearer Configuration information) relating to the second bearer. Then, the eNB 2 sets up the bearer (e.g., an S1 bearer) between the eNB 2 and the EPC 4 based on a bearer configuration information, and sets up a radio bearer (e.g., an EPS RB) associated with the UE 3. After the setup of the second bearer, the eNB 2 may send a completion notification to the eNB 1. At this time, the completion notification may include at least one of the terminal individual information and non-access stratum information of the UE 3.

The fifth exemplary procedure corresponds to the second exemplary procedure according to the first embodiment. In the fifth exemplary procedure, the eNB 1 sends a bearer setup request to the EPC 4, to thereby trigger the EPC 4 to set up the second bearer. The EPC 4 carries out bearer setup in the EPC 4 in response to the bearer setup request from the eNB 1, and notifies the eNB 1 of bearer configuration information (Bearer Configuration information) relating to the second bearer. The eNB 1 transfers at least part of the bearer configuration information to the eNB 2. The eNB 1 may send, to one or both of the EPC 4 and the eNB 2, at least one of the terminal individual information (UE Context information), initial terminal information (Initial UE message), and non-access stratum information (NAS information) of the UE 3 relating to the setup of the second bearer.

The sixth exemplary procedure corresponds to the third exemplary procedure according to the first embodiment. In the sixth exemplary procedure, similarly to the third exemplary procedure, the eNB 1 sends a bearer setup request to the EPC 4, to thereby trigger the EPC 4 to set up the second bearer. The EPC 4 carries out bearer setup in the EPC 4, and notifies the eNB 2 of bearer configuration information (Bearer Configuration information) relating to the second bearer. The eNB 2 performs setup relating to the second bearer (E-RAB setup) based on the bearer configuration information. In the sixth exemplary procedure, the eNB 1 may send, to one or both of the EPC 4 and the eNB 2, at least one of the terminal individual information (UE Context information), initial terminal information (Initial UE message), and non-access stratum information (NAS information) of the radio terminal 3 relating to the setup of the second bearer. Further, after the setup in the EPC 4 relating to the second bearer (e.g., endpoint configuration of an S1 bearer) is completed, the EPC 4 may send, to the eNB 1, directly or via the eNB 2, at least one of the terminal individual information and non-access stratum information of the UE 3.

In the fourth to sixth exemplary procedures, the eNB 1 may set up a radio bearer between the eNB 2 and the UE 3, and notify the eNB 2 of radio resource control information (RRC Configuration), radio resource configuration information (Radio Resource Configuration) and the like relating to the setup of the radio bearer.

In the fourth to the sixth exemplary procedures, the bearer configuration information may include at least one of the information elements listed below:

- bearer information (Bearer information): e.g., E-RAB ID, E-RAB Level QoS Parameters, UL GTP Tunnel Endpoint ID, or any combination thereof;
- radio terminal capability information (UE capability information): e.g., UE radio access capability, UE network capability, UE security capability, or any combination thereof;
- radio terminal identifier information (UE identification information): e.g., C-RNTI, (S-)TMSI, shortMAC-I, or any combination thereof;
- selected network information (UE selected network information): e.g., GUMMEI, eNB UE S1AP ID, MME UE S1AP ID, CSG ID, or any combination thereof; and
- security configuration information (Security configuration information): e.g., SecurityAlgorithmConfig.

The terminal individual information (UE Context information) may include at least one of the information elements listed below:

- radio terminal capability information (UE capability information): e.g., UE radio access capability, UE network capability, UE security capability, or any combination thereof;
- radio terminal identifier information (UE identification information): e.g., C-RNTI, (S-)TMSI, shortMAC-I, or any combination thereof;
- selected network information (UE selected network information): e.g., GUMMEI, eNB UE S1AP ID, MME UE S1AP ID, CSG ID, or any combination thereof;
- bearer information (Bearer information): e.g., E-RAB ID, E-RAB Level QoS Parameters, UL GTP Tunnel Endpoint ID, or any combination thereof;
- radio resource control information (RRC context information): AS-Config, AS-Context, ue-ConfigRelease, ue-RadioAccessCapabilityInfo, or any combination thereof;
- radio terminal mobility history information (UE history information): e.g., Last Visited Cell Information; and
- service information (Service information): e.g., QCI, QoS, MBMS information, or any combination thereof.

The initial terminal information (Initial UE Message) may include at least one of the information elements listed below:

- radio terminal identifier information (UE identification information): e.g., C-RNTI, (S-)TMSI, shortMAC-I, or any combination thereof;
- selected network information (UE selected network information): e.g., GUMMEI, eNB UE S1AP ID, MME UE S1AP ID, CSG ID, or any combination thereof;
- radio terminal area information (UE are information): e.g., Tracking Area ID (TAI), EUTRAN Cell Global ID (ECGI) or the combination thereof;
- radio connection purpose (cause) (Radio connection purpose information): e.g., RRC Establishment cause; and
- non-access stratum data (NAS data information): e.g., NAS PDU.

The non-access stratum information (NAS information) may include at least one of the information elements listed below:

- radio terminal identifier information (UE identification information): e.g., C-RNTI, (S-)TMSI, shortMAC-I, or any combination thereof;
- selected network information (UE selected network information): e.g., GUMMEI, eNB UE S1AP ID, MME UE S1AP ID, CSG ID, or any combination thereof;
- non-access stratum data (NAS data information): e.g., NAS PDU; and
- non-access stratum connection purpose (cause) (NAS connection purpose information): e.g., NAS cause.

Here, for example, Secondary cell configuration (or setup), Secondary bearer configuration (or setup), target bearer configuration (or setup), virtual bearer configuration (or setup) or the like may be defined as the RRC Establishment cause or the NAS cause.

The fourth to sixth exemplary procedures may be applied to various applications including, but not limited to, an application where the eNB 1 is a macro radio base station (Macro eNB: MeNB) that operates (manages) a macro cell with relatively large coverage and the eNB 2 is a low power radio station (Low Power Node: LPN) that operates (manages) a cell with small coverage. The LPN may be, for example, a pico radio base station (Pico eNB: PeNB) having similar functions as the MeNB, or may be a new type network node (New Node) with reduced functions as compared with the MeNB.

Figure 21:
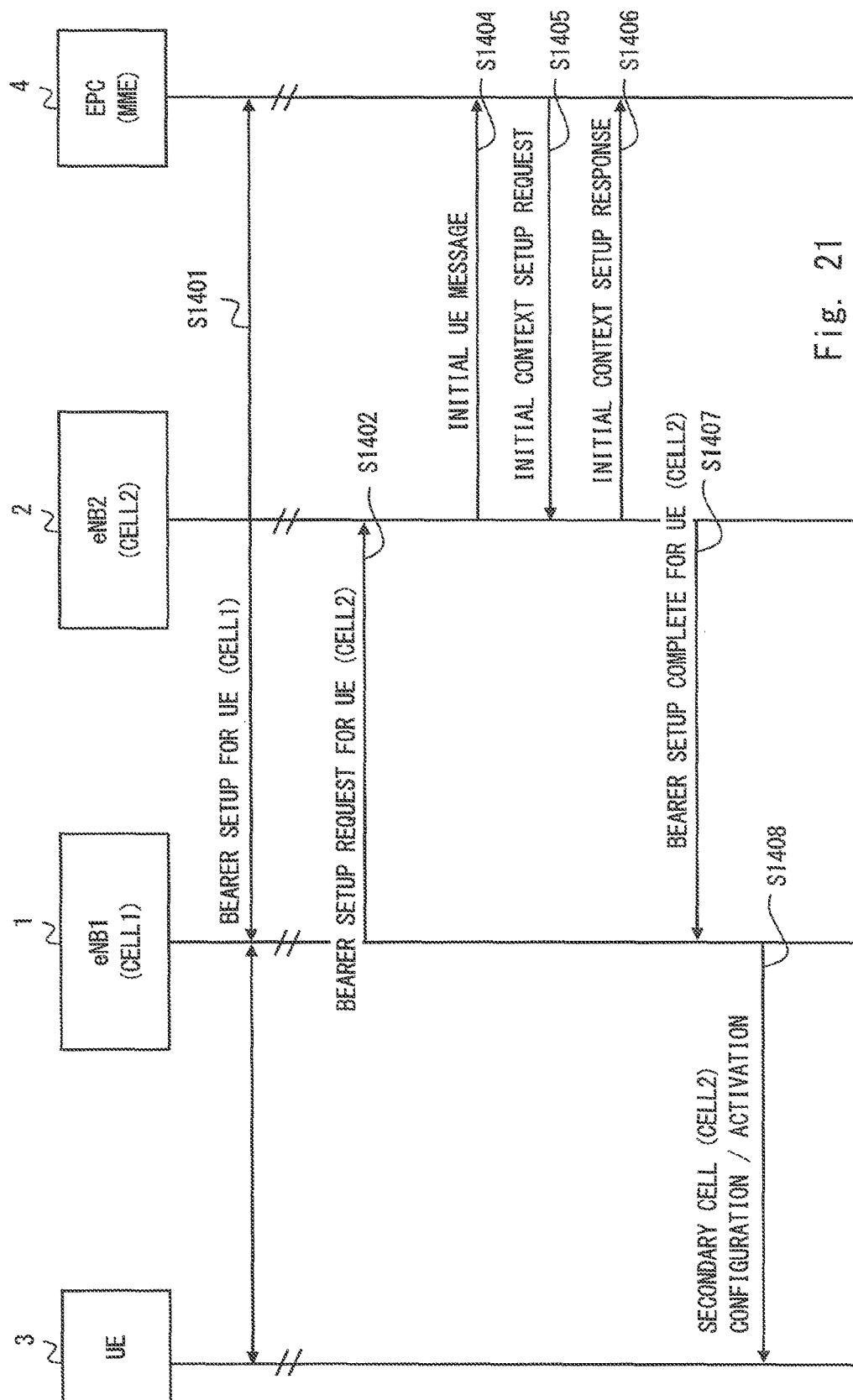
FIG. 21 is a sequence diagram showing an example of a bearer control method in the radio communication system according to the second embodiment (fourth exemplary procedure)
Figure 22:
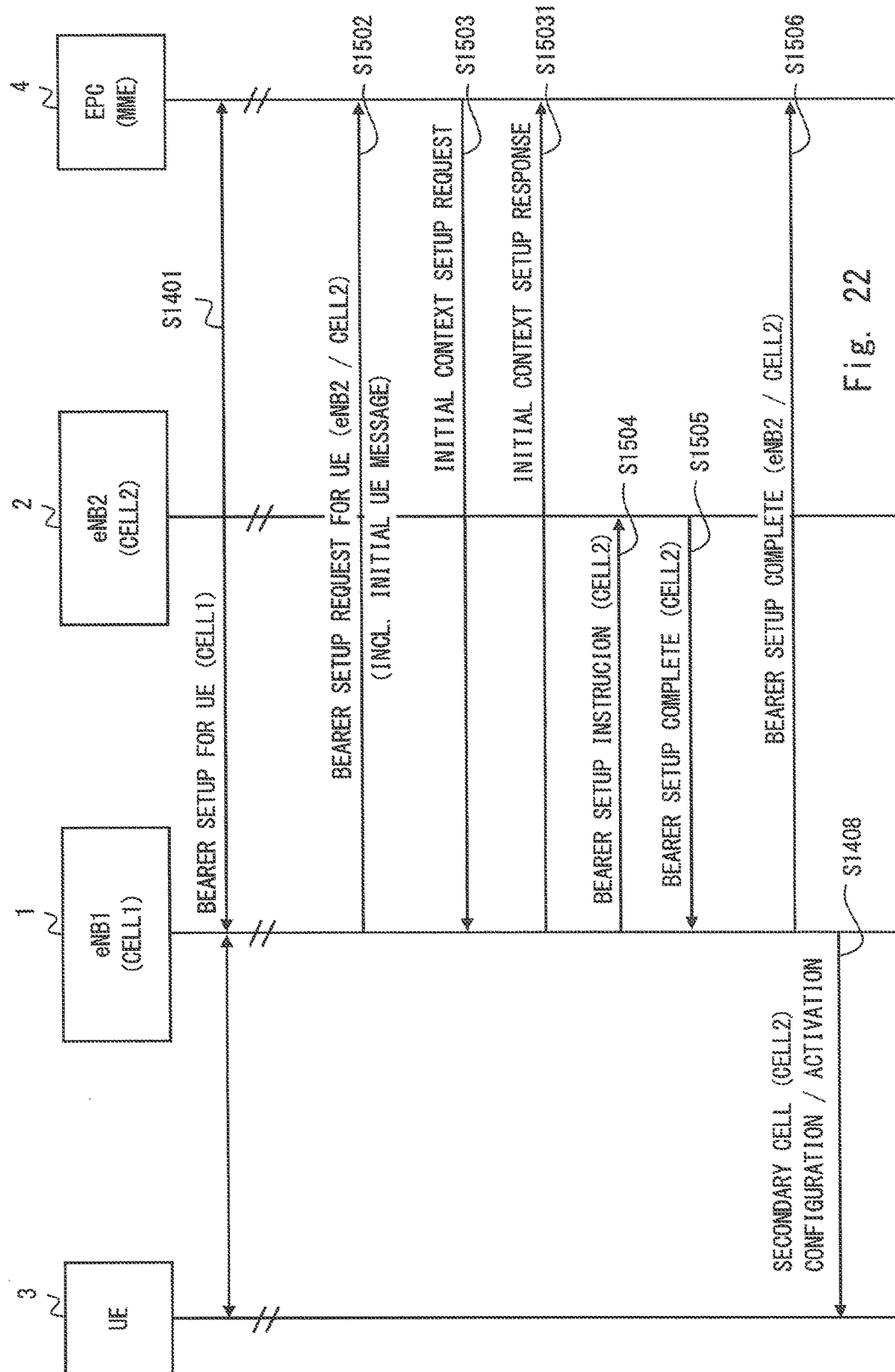
FIG. 22 is a sequence diagram showing an example of a bearer control method in the radio communication system according to the second embodiment (fifth exemplary procedure)
Figure 23:
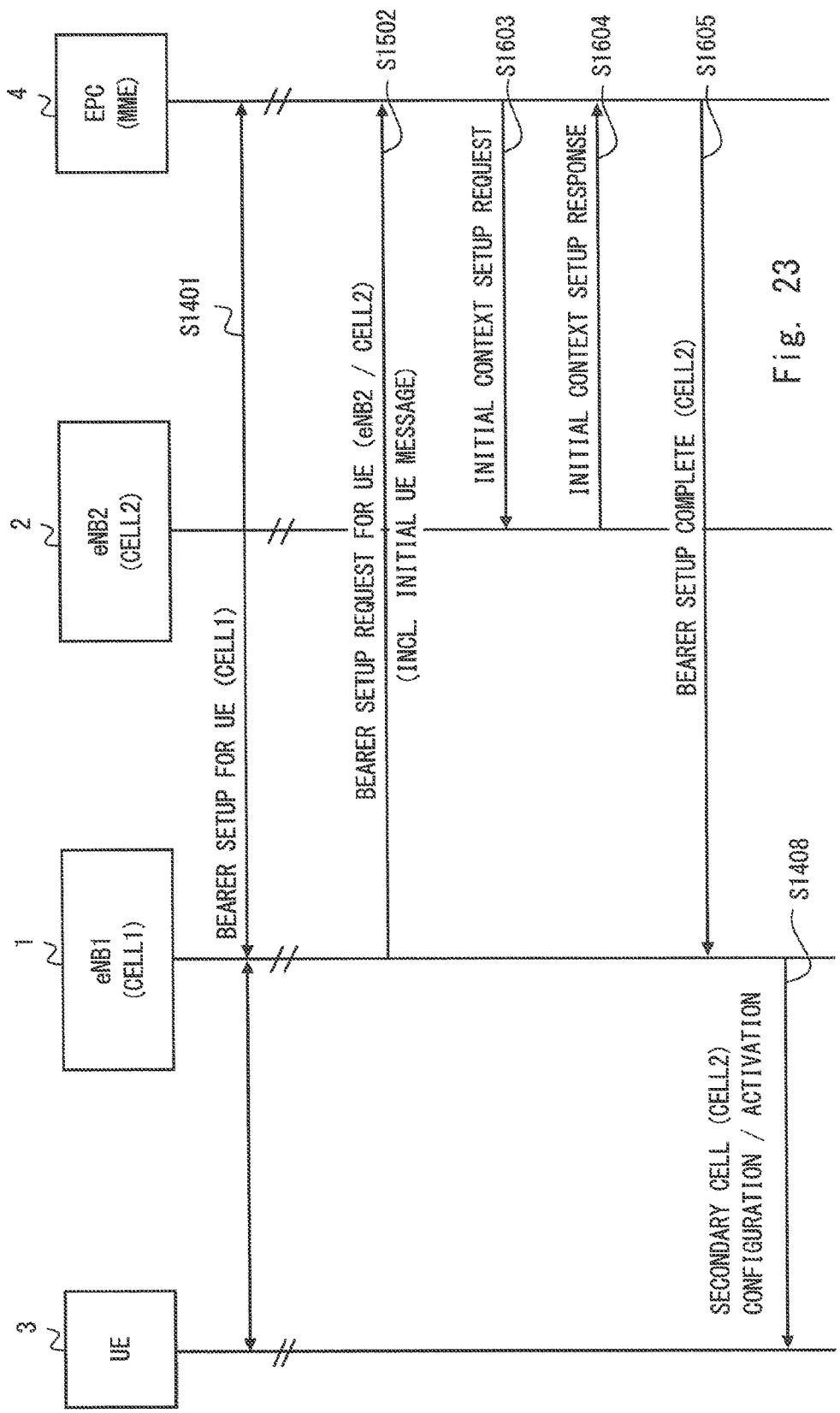
FIG. 23 is a sequence diagram showing an example of a bearer control method in the radio communication system according to the second embodiment (sixth exemplary procedure)

In the following, specific examples of the fourth to sixth exemplary procedures will be described. FIG. 21 is a sequence diagram showing the entire fourth exemplary procedure, and FIG. 22 is a sequence diagram showing the entire fifth exemplary procedure. FIG. 23 is a sequence diagram showing the entire fifth exemplary procedure.

Fourth Exemplary Procedure

In Step S1401 in FIG. 21, the UE 3, the eNB 1, and the EPC 4 set up a control bearer for sending and receiving control information on the cell 10 via the eNB 1 (Bearer Setup). Further, the UE 3, the eNB 1, and the EPC 4 may set up the first bearer for sending and receiving user data on the cell 10 via the eNB 1. In Step S1402, the eNB 1 sends, to the eNB 2, a setup request of the second bearer for the U3 (Bearer Setup Request). In Step 1403, the eNB 2 sends to the EPC 4 a setup request of the second bearer (Initial UE Message). The EPC 4 (MME 5) controls setup relating to the second bearer in the S-GW 6, in response to the request from the eNB 2. Further, in Step S1405, the EPC 4 (MME 5) instructs the eNB 2 about setup relating to the second bearer (Initial Context Setup Request). This instruction includes bearer configuration information relating to the second bearer. Note that, in place of the Initial Context Setup Request message, an E-RAB Setup Request message, an E-RAB Modify Request message or the like may be used, for example.

The eNB 2 performs setup relating to the second bearer based on the bearer configuration information. Then, in Step S1406, the eNB 2 sends a confirmation notification for bearer setup to the EPC 4 (Initial Context Setup Response). In place of the Initial Context Setup Response message, an E-RAB Setup Response message, an E-RAB Modify Response message or the like may be used, for example. In Step S1407, the eNB 2 notifies the eNB 1 of completion of setup of the second bearer (Bearer Setup Complete). In Step S1408, the eNB 1 sends, on the cell 10 and to the UE 3, a notification of use initiation of the second cell 20 (Secondary Cell Configuration/Activation).

Fifth Exemplary Procedure

The process in Step S1401 in FIG. 22 is similar to Step S1401 in FIG. 21. In Step S1502, the eNB 1 requests the EPC 4 to set up the second bearer for the UE 3 (Bearer Setup Request). The EPC 4 (MME 5) controls setup relating to the second bearer in the S-GW 6, in response to the request from the eNB 2. Further, in Step S1503, the EPC 4 (MME 5) instructs the eNB 1 about setup relating to the second bearer (Initial Context Setup Request). In place of the Initial Context Setup Request message, for example an E-RAB Setup Request message, an E-RAB Modify Request message or the like may be used. Such an instruction includes bearer configuration information relating to the second bearer. In Step S15031, the eNB 1 sends a response to the instruction from the EPC 4 (Initial Context Setup Response).

In Step S1504, the eNB 1 instructs the eNB 2 to set up the second bearer (Bearer Setup Instruction). The eNB 2 performs setup relating to the second bearer based on the instruction from the eNB 1. Further, in Step S1505, the eNB 2 sends a bearer setup completion notification to the eNB 1 (Bearer Setup Complete). In Step S1506, the eNB 1 sends a completion notification of setup of the second bearer to the EPC 4 (Bearer Setup Complete). The process in Step S1408 in FIG. 22 is similar to that in Step S1408 in FIG. 21.

Sixth Exemplary Procedure

The processes in Step S1401 and S1502 in FIG. 23 are similar to those in Steps S1401 and S1502 according to the second exemplary procedure shown in FIG. 22. In Step S1603, the EPC 4 (MME 5) instructs the eNB 2 about setup relating to the second bearer (Initial Context Setup Request). In place of the Initial Context Setup Request message, an E-RAB Setup Request message, an E-RAB Modify Request message or the like may be used, for example. This instruction includes bearer configuration information relating to the second bearer. In Step S1604, the eNB 2 performs setup relating to the second bearer based on the instruction from the EPC 4, and sends a bearer setup completion notification to the EPC 4 (Initial Context Setup Response). In place of the Initial Context Setup Response message, an E-RAB Setup Response message, an E-RAB Modify Response message or the like may be used, for example. In Step S1605, the EPC 4 sends a completion notification of setup of the second bearer to the eNB 1 (Bearer Setup Complete). The processes in Steps S508 and S509 in FIG. 19 are similar to those in Steps S508 and S509 according to the first exemplary procedure and the second exemplary procedure shown in FIGS. 11 and 15.

Third Embodiment

In the present embodiment, a modification of the second embodiment will be described. In an LTE system, the following three paths may be considered for example, as the transmission path for transmitting downlink user data to the UE 3 on the second cell 20 (i.e., the route of the second bearer).

ALT 1: All the downlink user data is transferred from the P/S-GW 6 to the eNB 2 (e.g., an LPN), and the eNB 2 sends the user data to the UE 3.

ALT 2: Part of the downlink user data is transferred from the P/S-GW 6 to the eNB 1 (e.g., an MeNB), while the remainder of the user data is transferred from the P/S-GW 6 to the eNB 2 (e.g., an LPN). Then, each of the eNB 1 and the eNB 2 sends downlink user data to the UE 3.

ALT 3: All the downlink user data is transferred from the P/S-GW 6 to the eNB 1 (e.g., an MeNB). Next, the eNB 1 transfers part of or all the downlink user data to the eNB 2 (e.g., an LPN) as necessary. Then, each of the eNB 1 and the eNB 2 sends downlink user data to the UE 3.

Note that, the ALT 1 may include the case where the eNB 1 serves as proxy (or a router), and downlink user data is transferred from the P/S-GW 6 to the eNB 2 via the eNB 1.

Figure 24:
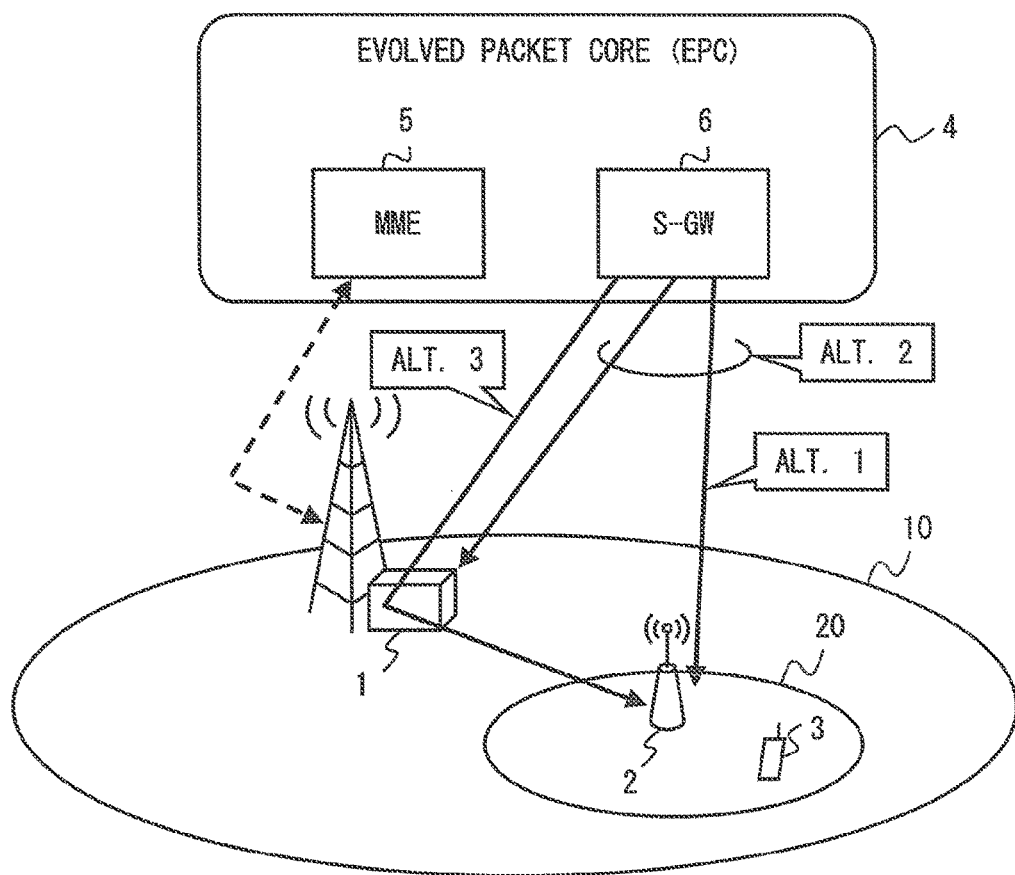
FIG. 24 is a diagram showing a configuration example of a radio communication system according to a third embodiment.

On the other hand, it may be considered that control information (Control Plane Information) to the UE 3 is basically transferred from the MME 5 to the eNB 1 (e.g., an MeNB), and the eNB 1 sends the control information to the UE 3. In the following, a description will be given based on the premise that this control information path is employed. FIG. 24 shows the paths ALT 1 to ALT 3, which are the downlink user data paths, and the control information path. However, control information path according to the present embodiment is not limited thereto. For example, the control information may be sent, similarly to user data, from the MME 5 to the eNB 2 via the eNB 1, or may be directly sent from the MME 5 to the eNB 2.

In the following, a specific example of a procedure for changing a downlink user data path in association with initiation of Inter-eNB CA will be described. Firstly, the second bearer is configured according to any one of the fourth to sixth exemplary procedures described in the second embodiment. The second bearer herein is an S1 bearer, which is configured between the EPC 4 and the eNB 2, or an E-RAB, which passes through the eNB 2. Then, the eNB 1 requests the MME 5 to change part of or all the paths of the downlink user data to the UE 3 to pass through the eNB 1. The MME 5 sends, in response to the request from the eNB 1, a downlink user data path change request to the P/S-GW 6 (herein, solely the S-GW, or both the S-GW and the P-GW). The P/S-GW 6 updates the bearer configuration (bearer context) in response to the request from the MME 5, to thereby change the path of the downlink user data. Whether to send the downlink user data path change request to solely the S-GW or to both the S-GW and the P-GW is determined, for example, based on the necessity to change the path of the core network bearer (S5/S8 bearer), or the necessity to change the packet filter (Traffic Flow Template: TFT) applied to the downlink user data at the P-GW.

In the case where a different path is used depending on downlink user data destined for the UE 3 (i.e., the ALT 2 or the ALT 3), the downlink user data must be divided into a plurality of data flows. This division may be carried out based on, for example, a type of service of downlink user data, quality of service (QoS), service quality class (Quality Class Indicator: QCI), real-time requirement (Real time or Non-real time) or the like. The switching of the downlink user data path on a UE-by-UE basis or a service-by-service (QoS, QCI) basis may be carried out such that the requirement of delay, minimum throughput or the like is satisfied.

Figure 25:
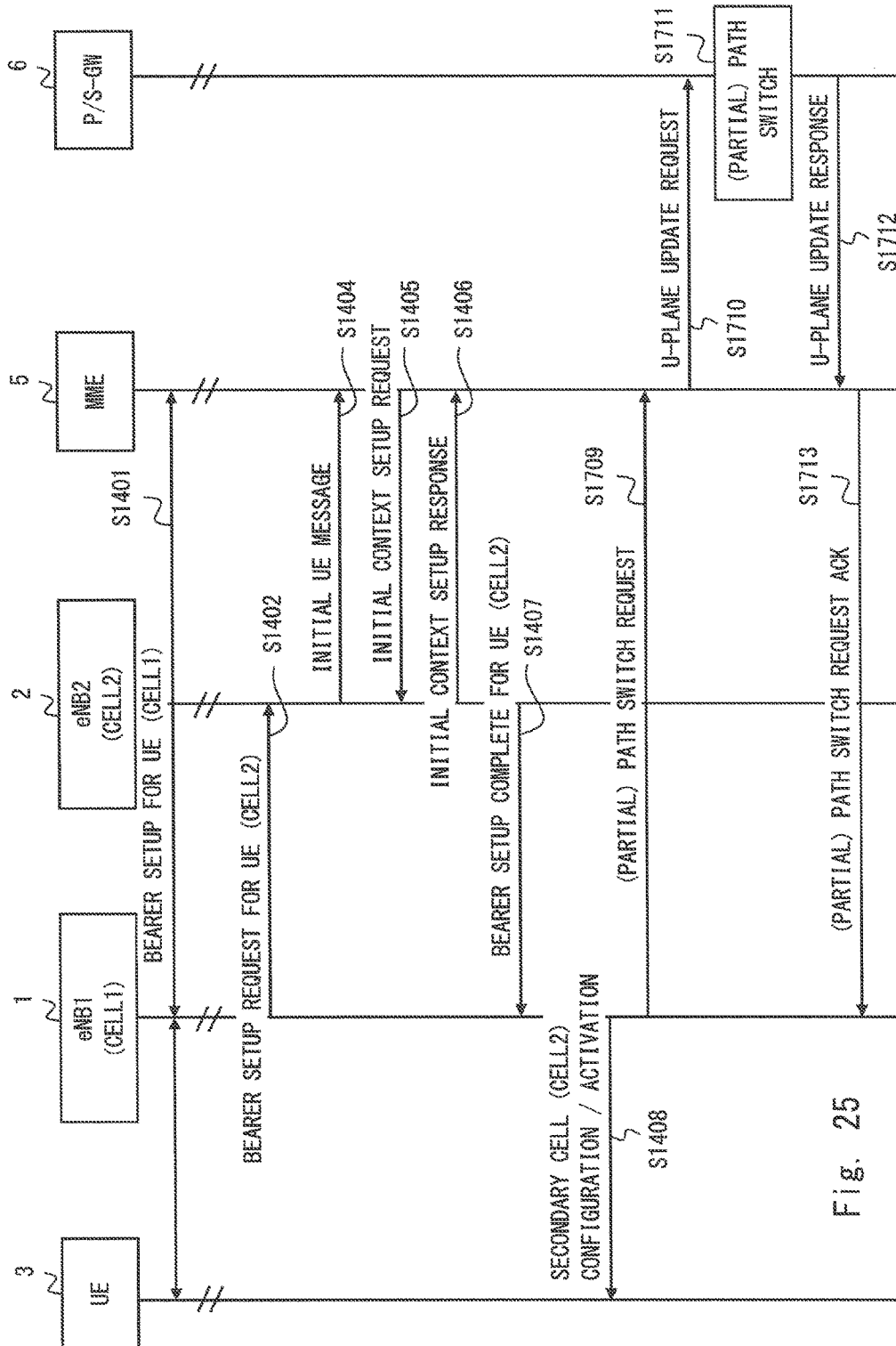
FIG. 25 is a sequence diagram showing an example of a method for changing a user data path in the radio communication system according to the second embodiment.
Figure 26:
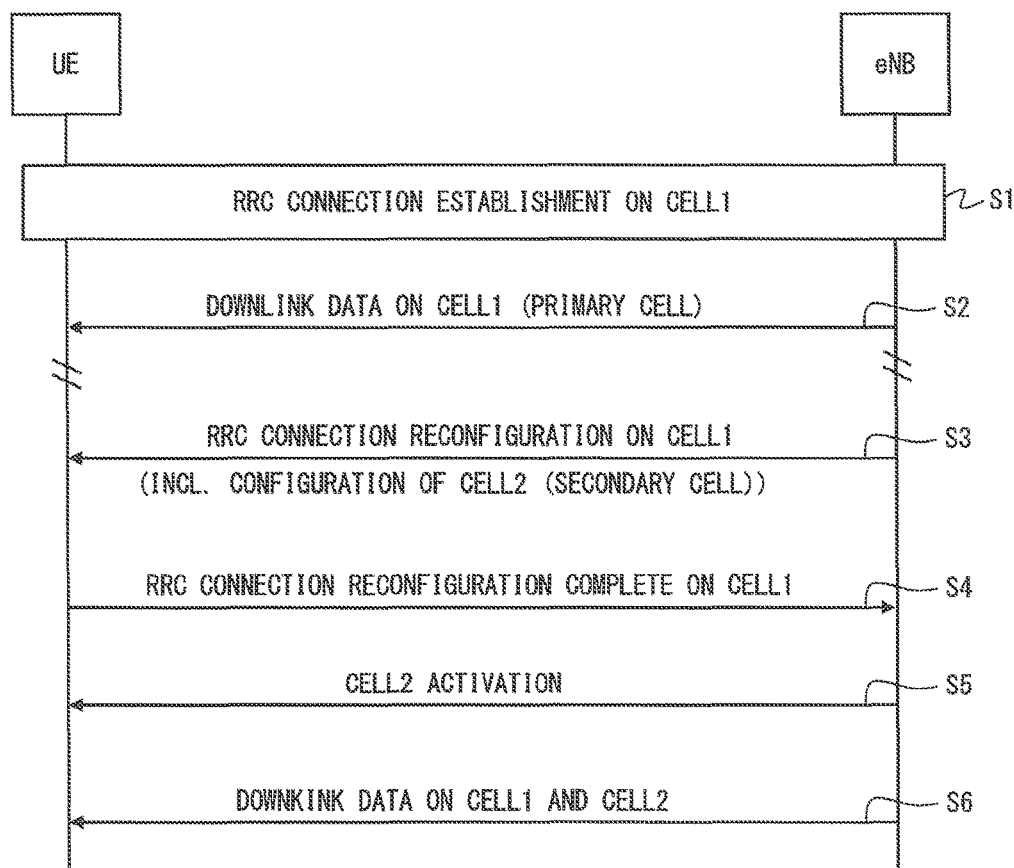
FIG. 26 is a sequence diagram showing a carrier aggregation procedure in LTE (Background Art).

FIG. 25 is a sequence diagram showing a downlink user data path change procedure according to the present embodiment. Note that, FIG. 25 is a modification of the sequence diagram of the fourth exemplary procedure described in the second embodiment (FIG. 21). The processes shown in Steps S1401 to S1408 in FIG. 25 are similar to those in S1401 to S1408 in FIG. 21. In Step S1709, the eNB 1 sends a request to switch a downlink user data path to the MME 5 ((Partial) Path Switch Request). In Step S1710, the MME 5 requests the P/S-GW 6 to change the bearer context or the packet filter ((Partial) U-Plane Update Request). In Step S1711, the P/S-GW 6 updates the bearer context or the packet filter based on the request from the MME 5, to thereby change part of or all the paths of the downlink user data destined for the UE 3. In Step S1712, the P/S-GW 6 notifies the MME 5 of completion of the path change (U-Plane Update Response). Finally, in Step S1713, the MME 5 notifies the eNB 1 of completion of the path change ((Partial) Path Switch Request ACK). Herein, "Partial" means that, in the case where part of user data is transferred to the eNB 1 and the remainder of the user data is transferred to the eNB 2, the transfer destination is set for each user data type (e.g., service or QoS). That is, Partial Path Switch Request, Partial U-Plane Update Request, Partial Path Switch Request ACK and the like are applied when realizing the aforementioned ALT 2.

Note that, though FIG. 25 is referred to as a modification of the fourth exemplary procedure, it goes without saying that the downlink user data path change procedure according to the present embodiment is applicable to the fifth exemplary procedure or the sixth exemplary procedure.

Other Embodiment A

In the second and third embodiments, the UE 3 may tramsmit control information (L1/L2 control information) of one or both of Layer 1 and Layer 2, on the secondary cell (cell 20) and using a physical uplink control channel (physical uplink control channel: PUCCH). Specifically, the UE 3 may use a PUCCH of the secondary cell (cell 20) for replying a response (e.g., H-ARQ (Hybrid Automatic Repeat Request) ACK, CQI (Channel Quality Indicator)/PMI (Precoding Matrix Indicator), or RI (Rank Indicator)) to downlink reception on the secondary cell (cell 20).

In the normal CA in which a single eNB operates a plurality of cells, L1/L2 control information using a PUCCH is entirely transmitted on the primary cell. If architecture similar to the normal CA is employed in the Inter-eNB CA, interworking between the eNB 1 and the eNB 2 is required, and thus a process delay, an additional network load or the like would occur. In contrast, use of the physical uplink control channel of the secondary cell (cell 20) for a response to downlink reception on the secondary cell (cell 20) eliminates the necessity of interworking between the eNB 1 and the eNB 2.

Other Embodiment B

In the first to third embodiments, the secondary cell (cell 20), which is added for carrier aggregation, may be used for only the downlink component carrier (Component Carrier: CC) or for only the uplink component carrier (CC).

Other Embodiment C

In the first to third embodiments, the primary cell (cell 10) and the secondary cell (cell 20) may be in different duplex modes. For example, the primary cell (cell 10) may be in FDD (Frequency Division Duplex) while the secondary cell (cell 20) may be in TDD (Time Division Duplex).

Other Embodiment D

The first to third embodiments show the operation in which the first radio station 1 (e.g., the eNB 1) triggers the setup of the second bearer to enable the radio terminal 3 (e.g., the UE 3) to transmit or receive user data on the second cell 20 via the second radio station 2 (e.g., the eNB 2). Further, when the second bearer is to be released (Release), the first radio station 1 may trigger the release of the bearer. For example, in the first or fourth exemplary procedure, in response to a request (i.e., trigger) from the radio station 1 (e.g., the eNB 1), the radio station 2 (e.g., the eNB 2) sends a setup request of the second bearer to the upper network 4 (e.g., the EPC 4 (i.e., the MME 5)). Similarly, when the second bearer is to be released, the radio station 2 may release the second bearer in response to a request for release of the second bearer from the radio station 1, and sends a notification of release of the second bearer (E-RAB Release Indication) to the upper network 4.

In the second or fifth exemplary procedure, the radio station 1 (e.g., the eNB 1) sends a setup request of the second bearer to the upper network 4 (e.g., the EPC 4 (i.e., the MME 5)), whereas the upper network 4 sets up the second bearer and notifies the radio station 2 (e.g., the eNB 2) of configuration information of the second bearer via the radio station 1. Similarly, when the second bearer is to be released, the radio station 1 may sends a release request of the second bearer (E-RAB Release Request) to the upper network 4. Next, the upper network 4 may release the second bearer in response to the release request of the second bearer, and may send a release instruction of the second bearer (E-RAB Release Command) to the radio station 1. Then, the radio station 1 may transfer the release instruction to the radio station 2, and notify the upper network 4 of completion of release of the second bearer (E-RAB Release Complete) in response to release of the second bearer at the radio station 2.

In the third or sixth exemplary procedure, the radio station 1 (e.g., the eNB 1) sends a setup request of the second bearer to the upper network 4 (e.g., the EPC 4 (i.e., the MME 5)), and the upper network 4 sets up the second bearer and notifies the radio station 2 (e.g., the eNB 2) of second bearer configuration information. Similarly, when the second bearer is to be released, the radio station 1 may send a release request of the second bearer (E-RAB Release Request) to the upper network 4. Next, the upper network 4 may release the second bearer in response to the second bearer release request, and notify the radio station 2 of a release instruction of the second bearer (E-RAB Release Command). Then, the radio station 2 may release the second bearer in response to the release instruction, and notify the upper network 4 of completion of release of the second bearer (E-RAB Release Complete). Thus, in the case where the radio terminal 3 (e.g., the UE 3) subjects the cells of different radio stations to carrier aggregation, the second bearer having been used for transmission or reception of user data on the secondary cell can be released without inviting an increase in the load on the radio terminal 3.

Other Embodiment E

The drawings referred to in the first to third embodiments show the heterogeneous network (HetNet) environment. However, such embodiments are applicable also to a homogenous network (Homogeneous Network). Example of the Homogeneous Network may be a cellular network formed by macro (or micro) cells operated by macro (or micro) base stations.

Other Embodiment F

The bearer control methods performed by the radio station 1 (communication control unit 15), the radio station 2

(communication control unit 25), the radio terminal 3 (communication control unit 35), the mobility management apparatus 5 (bearer setup control unit 52), and the data transferring apparatus 6 (bearer control unit 65) described in the first to third embodiments each may be implemented by using a semiconductor processing device including an Application Specific Integrated Circuit (ASIC)). Alternatively, these processes each may be implemented by causing a computer system including at least one processor (e.g., a microprocessor, a Micro Processing Unit (MPU) or a Digital Signal Processor (DSP)) to execute a program. More specifically, one or more programs including instructions for causing a computer system to perform the algorithms explained with reference to the flowcharts and sequence diagrams may be created and supplied to a computer system.

This program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiment G

In the first to third embodiments, the description has been given mainly of the LTE system. However, these embodiments may be applied also to a radio communication system other than the LTE system, e.g., a 3GPP UMTS (Universal Mobile Telecommunications System), a 3GPP2 CDMA2000 system (1×RTT, HRPD (High Rate Packet Data)), a GSM (Global System for Mobile Communications) system, a WiMAX system or the like.

Furthermore, the embodiments stated above are merely examples of application of the technical ideas obtained by the present inventor. Needless to say, these technical ideas are not limited to those described in the above embodiments and may be changed in various ways.

This application is based upon and claims the benefit of priority from Japanese Patent Application No. 2012-223178 filed on Oct. 5, 2012, and the disclosure of which is incorporated herein in its entirety by reference.

REFERENCE SIGNS LIST

1 RADIO STATION
2 RADIO STATION
3 RADIO TERMINAL
4 UPPER NETWORK
5 MOBILITY MANAGEMENT APPARATUS
6 DATA TRANSFERRING APPARATUS
15 COMMUNICATION CONTROL UNIT
25 COMMUNICATION CONTROL UNIT
35 COMMUNICATION CONTROL UNIT
52 BEARER SETUP CONTROL UNIT
65 BEARER CONTROL UNIT

The invention claimed is:
1. A communication system comprising:
a first radio station that operates a first cell;
a second radio station that operates a second cell;
a radio terminal capable of aggregating the first cell operated by the first radio station with the second cell operated by the second radio station; and
a mobility management node that is connected with the first radio station, wherein
the first radio station is configured to send, to the mobility management node, a request regarding a configuration of a bearer that goes through the second radio station and does not go through the first radio station; and
the mobility management node is configured to send a response to the request regarding the configuration of the bearer to the first radio station, wherein
the request regarding the configuration of the bearer includes a bearer identity of the bearer and a bearer endpoint identity on the second radio station.

2. The communication system according to claim 1, wherein the request regarding the configuration of the bearer is a setup request to setup the bearer or a change request to change the bearer for updating a path of downlink user data that goes through the second radio station and does not go through the first radio station.

3. The communication system according to claim 1, wherein the mobility management node is further configured to:
send, to a gateway, a modify bearer request in response to receiving the request regarding the configuration of the bearer, and
receive a modify bearer response from the gateway, wherein
the response to the request regarding the configuration of the bearer is sent from the mobility management node to the first radio station after receiving the modify bearer response by the mobility management node.

4. The communication system according to claim 1, wherein the first radio station is further configured to:
send, to the second radio station, a request message for configuring the bearer that goes through the second radio station and does not go through the first radio station, wherein the request message includes a bearer identity of the bearer and a bearer endpoint identity on the second radio station, and
receive a response to the request message from the second radio station, wherein
the request regarding a configuration of the bearer is sent from the first radio station to the mobility management node after receiving the response to the request message by the first radio station.

5. A first radio station that operates a first cell, the first radio station comprising:
a transceiver;
a first interface configured to be connected with a mobility management node that operates mobility of a radio terminal, and
a second interface configured to be connected with a second radio station that operates a second cell;
a processor configured to:
communicate with the radio terminal capable of aggregating the first cell with the second cell by using the transceiver,
send, to the mobility management node by using the first interface, a request regarding a configuration of a bearer that goes through the second radio station and does not go through the first radio station, and receive, from the mobility management node by using the first interface, a response to the request regarding the configuration of the bearer, wherein the request regarding the configuration of the bearer includes a bearer identity of the bearer and a bearer endpoint identity on the second radio station.

6. The first radio station according to claim 5, wherein the request regarding the configuration of the bearer is a setup request to setup the bearer or a change request to change the bearer for updating a path of downlink user data that goes through the second radio station and does not go through the first radio station.

7. The first radio station according to claim 5, wherein the processor is further configured to:

send, to the second radio station by using the second interface, a request message for configuring the bearer that goes through the second radio station and does not go through the first radio station, wherein the request message includes a bearer identity of the bearer and a bearer endpoint identity on the second radio station, and receive a response to the request message from the second radio station by using the second interface, wherein the request regarding a configuration of the bearer is sent from the first radio station to the mobility management node after receiving the response to the request message by the first radio station.

8. A mobility management node that operates mobility of a radio terminal, wherein the radio terminal is capable of aggregating a first cell operated by a first radio station with a second cell operated by a second radio station, the mobility management node comprising:

a first interface configured to be connected with the first radio station; and a processor configured to:

receive, from the first radio station by using the first interface, a request regarding a configuration of a bearer that goes through the second radio station and does not go through the first radio station, and send, to the first radio station by using the first interface, a response to the request regarding the configuration of the bearer, wherein the request regarding the configuration of the bearer includes a bearer identity of the bearer and a bearer endpoint identity on the second radio station.

9. The mobility management node according to claim 8, wherein the request regarding the configuration of the bearer is a setup request to setup the bearer or a change request to change the bearer for updating a path of downlink user data that goes through the second radio station and does not go through the first radio station.

10. The mobility management node according to claim 8, further comprising:

a third interface configured to connected with a gateway, wherein the processor is further configured to:

send to the gateway by using the third interface, a modify bearer request in response to receiving the request regarding the configuration of the bearer, and receive a modify bearer response from the gateway by using the third interface, wherein the response to the request regarding the configuration of the bearer is sent from mobility management node to the first radio station after receiving the modify bearer response by the mobility management node.

11. A method in a first radio station that operates a first cell, the method comprising:

communicating with a radio terminal capable of aggregating the first cell with a second cell operated by a second radio station, sending, to a mobility management node that operates mobility of the radio terminal, a request regarding a configuration of a bearer that goes through the second radio station and does not go through the first radio station, and receiving, from the mobility management node, a response to the request regarding the configuration of the bearer, wherein the request regarding the configuration of the bearer includes a bearer identity of the bearer and a bearer endpoint identity on the second radio station.

12. A method in a mobility management node that operates mobility of a radio terminal, wherein the radio terminal is capable of aggregating a first cell operated by a first radio station with a second cell operated by a second radio station, the method comprising:

receiving, from the first radio station, a request regarding a configuration of a bearer that goes through the second radio station and does not go through the first radio station, and sending, to the first radio station, a response to the request regarding the configuration of the bearer, wherein the request regarding the configuration of the bearer includes a bearer identity of the bearer and a bearer endpoint identity on the second radio station.

* * * * *